(12) United States Patent
Mitsui et al.

(10) Patent No.: US 9,945,007 B2
(45) Date of Patent: Apr. 17, 2018

(54) DEZINCIFICATION PLANT, METHOD FOR OPERATING DEZINCIFICATION PLANT, AND HYDROMETALLURGICAL METHOD FOR NICKEL OXIDE ORE

(71) Applicant: SUMITOMO METAL MINING CO., LTD., Tokyo (JP)

(72) Inventors: Hiroyuki Mitsui, Tokyo (JP); Osamu Nakai, Tokyo (JP); Satoshi Matsubara, Tokyo (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 717 days.

(21) Appl. No.: 14/382,632

(22) PCT Filed: Mar. 1, 2013

(86) PCT No.: PCT/JP2013/055706
§ 371 (c)(1),
(2) Date: Sep. 3, 2014

(87) PCT Pub. No.: WO2013/133172
PCT Pub. Date: Sep. 12, 2013

(65) Prior Publication Data
US 2015/0023849 A1      Jan. 22, 2015

(30) Foreign Application Priority Data

Mar. 6, 2012   (JP) .................. 2012-049511

(51) Int. Cl.
*C22B 3/00*   (2006.01)
*C22B 3/04*   (2006.01)

(52) U.S. Cl.
CPC ............. *C22B 23/043* (2013.01); *C22B 3/04* (2013.01); *C22B 23/0461* (2013.01); *C22B 23/0469* (2013.01); *Y02P 10/234* (2015.11)

(58) Field of Classification Search
None
See application file for complete search history.

(56) References Cited

U.S. PATENT DOCUMENTS

| | | | | |
|---|---|---|---|---|
| 2005/0265910 | A1* | 12/2005 | Kobayashi | .......... C22B 23/0461 423/140 |
| 2010/0028227 | A1* | 2/2010 | Shibayama | ............ C01G 53/11 423/150.1 |
| 2010/0034716 | A1* | 2/2010 | Nakai | ...................... C01G 9/08 423/101 |

FOREIGN PATENT DOCUMENTS

| | | |
|---|---|---|
| CA | 2 775 915 A1 | 4/2011 |
| JP | A-06-116660 | 4/1994 |

(Continued)

OTHER PUBLICATIONS

Oct. 29, 2015 extended Search Report issued in European Patent Application No. 13758324.1.

(Continued)

*Primary Examiner* — Melissa S Swain
(74) *Attorney, Agent, or Firm* — Oliff PLC

(57) ABSTRACT

The present invention provides a hydrometallurgical method for nickel oxide ore, wherein the plant can be smoothly started up without imposing a load onto a filter cloth for a separation treatment of zinc sulfide, and the amount of residual zinc in a mother liquor for nickel recovery can be reduced to 1 mg/L. In the plant start-up after the completion of a periodic inspection, a post-neutralization solution is controlled to return to a neutralization reaction tank via circulation piping by adjustment of a switching valve in flow piping without sulfurizing post-neutralization solution. When the flow rate and/or the temperature of the post-neutralization solution circulated reaches a predetermined value, a sulfurization treatment is applied to the post-neutralization solution in the dezincification reaction tank to (Continued)

form zinc-sulfide-containing mother liquor for nickel recovery and adjust the switching valve. Zinc-sulfide-containing mother liquor for nickel recovery is transferred to a filter apparatus via transfer piping.

5 Claims, 4 Drawing Sheets

(56) References Cited

FOREIGN PATENT DOCUMENTS

| | | |
|---|---|---|
| JP | A-2005-350766 | 12/2005 |
| JP | A-2010-037626 | 2/2010 |
| JP | A-2010-095788 | 4/2010 |
| WO | WO 2011/129395 A1 | 10/2011 |

OTHER PUBLICATIONS

May 28, 2013 International Search Report issued in International Application No. PCT/JP2013/055706.

\* cited by examiner

DEZINCIFICATION PLANT, METHOD FOR OPERATING DEZINCIFICATION PLANT, AND HYDROMETALLURGICAL METHOD FOR NICKEL OXIDE ORE

FIELD OF THE INVENTION

The present invention relates to a dezincification plant and a method for operating a dezincification plant, and a hydrometallurgical method for nickel oxide ore, more specifically relates to a dezincification plant used in a dezincification step of a hydrometallurgical method for nickel oxide ore, the dezincification step being such that a post-neutralization solution obtained by neutralizing a leachate of nickel oxide ore is sulfurized to form zinc sulfide, and a mother liquor for nickel recovery is obtained, the mother liquor containing nickel and cobalt; and a method for operating said dezincification plant; and said hydrometallurgical method for nickel oxide ore. The present application asserts priority rights based on JP Patent Application 2012-049511 filed in Japan on Mar. 6, 2012. The total contents of disclosure of the Patent Application of the senior filing date are to be incorporated by reference into the present Application.

BACKGROUND OF THE INVENTION

In recent years, a high pressure acid leaching method (HPAL method) using sulfuric acid has been attracting attention as a hydrometallurgical method for nickel oxide ore. Unlike pyrometallurgy, which is a conventional common refining method for nickel oxide ore, this method does not include a pyrometallurgical process, such as a reduction or drying process, but includes a consistent hydrometallurgical process, and thus is advantageous in terms of energy and cost. In addition, this method has another advantage that a sulfide containing nickel and cobalt (hereinafter, sometimes referred to as a nickel-cobalt mixed sulfide) whose nickel grade is improved up to approximately 50% by mass can be obtained.

This hydrometallurgical method for nickel oxide ore using the high pressure acid leaching method has, for example, the following steps. In other words, the hydrometallurgical method comprises: a leaching step wherein sulfuric acid is added to a slurry of nickel oxide ore and leached under high temperature and high pressure thereby to obtain a leached slurry; a solid-liquid separation step wherein multistage washing is applied to the leached slurry, whereby a leached residue is separated therefrom while a leachate containing an impurity element as well as nickel and cobalt is obtained; a neutralization step wherein the pH of the leachate obtained by the separation is adjusted to separate a neutralized precipitate containing impurity elements therefrom, whereby a post-neutralization solution containing zinc as well as nickel and cobalt is obtained; a dezincification step wherein hydrogen sulfide gas is added to the post-neutralization solution thereby to form a zinc sulfide, and the zinc sulfide is separated to obtain a mother liquor containing nickel and cobalt for nickel recovery; and a nickel recovery step wherein hydrogen sulfide gas is added to the mother liquor for nickel recovery to form a nickel-cobalt mixed sulfide, and the nickel-cobalt mixed sulfide is separated therefrom.

Here in the above-mentioned neutralization step of the hydrometallurgical method, for example, a leachate obtained from the solid-liquid separation step is fed into a neutralization tank and a calcium carbonate slurry is added thereto, thereby neutralizing the leachate, and an obtained hydroxide precipitate is solid-liquid separated, whereby a neutralized precipitate and a post-neutralization solution are obtained.

Furthermore, in the dezincification step, a post-neutralization solution is fed into a sulfurization reaction tank, and a sulfurizing agent, such as hydrogen sulfide gas or sodium hydrosulfide, is added thereto, thereby sulfurizing zinc, copper, and the like which are contained in the post-neutralization solution, and then solid-liquid separation is performed using a filter press or the like, whereby a mother liquor for nickel recovery, the mother liquor containing zinc sulfide, nickel, and cobalt, is obtained. (For example, refer to Patent Literatures 1 and 2.).

It should be noted that the nickel-cobalt mixed sulfide obtained by this hydrometallurgical method is further used as a raw material for purification to obtain electrolytic nickel and electrolytic cobalt, and therefore, in the above-mentioned dezincification step, the concentration of zinc (Zn) contained in a post-dezincification solution is required to be reduced to not more than 1 mg/L.

Furthermore, in the dezincification step, when a zinc sulfide formed is filtered and separated using a filter cloth, it is desirable to prevent the filter cloth from clogging up, thereby inhibiting a reduction in filtration velocity.

As a method for preventing a filter cloth from clogging up, there has been proposed a technique wherein a post-neutralization solution obtained by the above-mentioned neutralization step is adjusted to have a pH of 3.0 to 3.5, and also said post-neutralization solution is made to have a turbidity of 100 to 400 NTU, whereby a suspended solid comprising a neutralized precipitate and a leach residue is made to remain, and thus filterability is improved (For example, refer to Patent Literature 3.).

Furthermore, the operation in each of the steps is performed at a predetermined temperature and controlled under the optimal temperature. For example, in the neutralization step and the dezincification step mentioned above, the operation is performed at approximately 50 degrees C., and, each plant is equipped with equipment, such as a steam heater, capable of maintaining process water (including a valuable-metal-containing solution as an intermediate product, a post-neutralization solution, an overflow solution, and a post-dezincification solution) at an appropriate temperature.

However, at the time of a periodic inspection of a plant, removal of sludge staying at the bottom of each equipment (including tanks to store process water, such as a reaction tank, a thickening apparatus, and a storage tank; piping; and filters); cleaning of the equipment; replacement of breakage parts; and the like need to be performed, and therefore at least equipment to be subject to the inspection is drained of process water and made to be empty, and the temperatures of the equipment and the process water are reduced to an approximately atmospheric temperature (approximately 30 degrees C.).

Furthermore, in the start-up of a plant after completion of the periodic inspection, it takes approximately one day for a step of adding sulfuric acid to a slurry of nickel oxide ore and leaching under high temperature and high pressure (leaching step) to be in the 100% operating condition, and therefore the flow rate of process water during the above-mentioned start-up operation is unstable.

The dezincification step is particularly greatly affected by a temporary shut down due to such periodic inspection or the like, and thus it is difficult to simultaneously add hydrogen sulfide gas and a suspended solid as a seed crystal to process water whose flow rate and temperature are unstable. Furthermore, this implies that zinc as an impurity of high concentration is mixed into a nickel-cobalt mixed sulfide obtained after a sulfurization reaction in the nickel recovery step which follows the dezincification step.

Therefore, in the period of approximately one day required for the start-up, in order to reduce the concentration of zinc contained in a post-dezincification solution to not more than 1 mg/L, there is taken a measure wherein excessive hydrogen sulfide gas is added so that no zinc remains in a mother liquor for nickel recovery, the mother liquor being formed through the dezincification step. However, in this case, there is a problem that the zinc sulfide has a minute particle size, whereby a heavy load is imposed on a treatment of separating the zinc sulfide and a mother liquor for nickel recovery containing nickel and cobalt. Specifically, for example, a problem arises that a filter cloth (filter) used for the separation has a shorter lifespan.

Therefore, considering the above, there has been desired an operating method by which, plant start-up after completion of a periodic maintenance inspection or the like can be smoothly performed without imposing a load onto a filter cloth in the above-mentioned separation treatment of zinc sulfide, and the concentration of zinc in the post-dezincification solution can be effectively reduced, for example, even to a low concentration of not more than 1 mg/L.

PRIOR-ART DOCUMENTS

Patent Document

PTL 1: Japanese Patent Application Laid-Open No. H06-116660
PTL 2: Japanese Patent Application Laid-Open No. 2005-350766
PTL 3: Japanese Patent Application Laid-Open No. 2010-037626

SUMMARY OF THE INVENTION

The present invention is proposed in view of such actual circumstances, and aims to provide a hydrometallurgical method for nickel oxide ore, the method allowing, at the time of plant startup after completion of a periodic inspection or the like, the start-up to be smoothly performed without imposing a load onto a filter cloth used for a separation treatment of zinc sulfide, thereby allowing the amount of residual zinc in a post-dezincification solution to be effectively reduced.

The present inventors have earnestly studied to achieve the above-mentioned aim. As a result, the inventors have found that, in a dezincification step of a hydrometallurgical method for nickel oxide ore, at the time of plant start-up, a post-neutralization solution is controlled to be returned to a dezincification reaction treatment without sulfurizing the post-neutralization solution, and circulated. With such operation, the flow rate and the temperature of the post-neutralization solution is adjusted to be stabilized, thereby allowing the start-up to be smoothly performed and a dezincification reaction to be effectively performed, whereby the amount of residual zinc in a mother liquor for nickel recovery as a post-dezincification solution can be effectively reduced, and thus the inventors completed the present invention.

That is, a dezincification plant according to the present invention is a dezincification plant used in a dezincification step of a hydrometallurgical method for nickel oxide ore, the dezincification step being such that a sulfurization treatment is applied to a post-neutralization solution obtained through a neutralization step of neutralizing a leachate of said nickel oxide ore thereby to form zinc sulfide, and said zinc sulfide is separated to obtain a mother liquor containing nickel and cobalt for nickel recovery, the dezincification plant comprising: a dezincification reaction tank configured to form zinc sulfide by applying a sulfurization treatment to the above-mentioned post-neutralization solution and form a mother liquor containing said zinc sulfide for nickel recovery; a filter apparatus configured to separate out the above-mentioned zinc sulfide and the above-mentioned mother liquor for nickel recovery; and a storage tank configured to temporarily store the above-mentioned mother liquor containing the zinc sulfide for nickel recovery while to provide flow piping coupled to transfer piping connected to the above-mentioned filter apparatus, thereby transferring said mother liquor containing the zinc sulfide for nickel recovery to said filter apparatus, wherein the dezincification plant is configured such that the above-mentioned flow piping installed in the above-mentioned storage tank is coupled to circulation piping at a coupling portion to the above-mentioned transfer piping, and thereby branched, and a switching valve is provided to said branch point, furthermore, a measurement portion to measure the flow rate and/or the temperature of a solution flowing through said flow piping is provided to the above-mentioned flow piping, and, in the start-up of the dezincification plant after completion of a periodic inspection thereof, at the time of starting the start-up, without applying a sulfurization treatment to the above-mentioned post-neutralization solution, said post-neutralization solution is controlled by adjustment of the above-mentioned switching valve, thereby being circulated to the above-mentioned dezincification reaction tank via the above-mentioned circulation piping coupled to the flow piping of the above-mentioned storage tank, and, when the flow rate and/or the temperature of the post-neutralization solution circulated reaches a predetermined value or more, a sulfurization treatment is applied to the post-neutralization solution in the dezincification reaction tank thereby to produce a mother liquor containing zinc sulfide for nickel recovery, and said mother liquor containing zinc sulfide for nickel recovery is transferred to the above-mentioned filter apparatus via the above-mentioned flow piping by adjustment of the above-mentioned switching valve.

A method for operating a dezincification plant according to the present invention is a method for operating a dezincification plant used in a hydrometallurgical method for nickel oxide ore, the dezincification step being such that a sulfurization treatment is applied to a post-neutralization solution obtained through a neutralization step of neutralizing a leachate of said nickel oxide ore thereby to form zinc sulfide, and said zinc sulfide is separated to obtain a mother liquor for nickel recovery, the mother liquor containing nickel and cobalt, the dezincification plant comprising: a dezincification reaction tank configured to form zinc sulfide by applying a sulfurization treatment to the above-mentioned post-neutralization solution and produce a mother liquor for nickel recovery, the mother liquor containing said zinc sulfide; a filter apparatus configured to separate the above-mentioned zinc sulfide and the above-mentioned mother liquor for nickel recovery; and a storage tank configured to temporarily store the above-mentioned mother liquor for nickel recovery containing zinc sulfide while to install flow piping coupled to transfer piping connected to the above-mentioned filter apparatus, thereby transferring said mother liquor for nickel recovery containing zinc sulfide to said filter apparatus, wherein the above-mentioned flow piping installed in the above-mentioned storage tank is coupled to circulation piping at a coupling portion to the above-mentioned transfer piping, and thereby branched, and a switching valve is installed at said branch point, and furthermore, a measurement portion to measure the flow rate and/or the temperature of a solution flowing through said flow piping is installed in the above-mentioned flow piping, and, in the start-up of the dezincification plant after completion of a periodic inspection, at the time of starting the start-up, without applying a sulfurization treatment to the above-mentioned post-neutralization solution, said post-neutralization solution is controlled by adjustment of the above-mentioned switching valve thereby to be circulated to the above-mentioned dezincification reaction tank via the above-mentioned circulation piping coupled to the flow piping of the above-mentioned storage tank, and, when the flow rate and/or the temperature of the post-neutralization solution circulated reaches a predetermined value or more, a sulfurization treatment is applied to the post-neutralization solution in the dezincification reaction tank thereby to form a zinc-sulfide-containing mother liquor for nickel recovery, and said zinc-sulfide-containing mother liquor for nickel recovery is transferred to the above-mentioned filter apparatus via the above-mentioned flow piping by adjustment of the above-mentioned switching valve.

A hydrometallurgical method for nickel oxide ore according to the present invention comprises: a neutralization step of neutralizing a leachate obtained by leaching nickel oxide ore, thereby obtaining a neutralized precipitate containing an impurity and a post-neutralization solution containing zinc as well as nickel and cobalt; and a dezincification step of applying a sulfurization treatment to said post-neutralization solution thereby to form zinc sulfide and separating said zinc sulfide thereby to obtain a mother liquor containing nickel and cobalt for nickel recovery, wherein a dezincification plant performing a dezincification treatment in the above-mentioned dezincification step comprises: a dezincification reaction tank configured to form zinc sulfide by applying a sulfurization treatment to the above-mentioned post-neutralization solution and form a mother liquor for nickel recovery, the mother liquor containing said zinc sulfide; a filter apparatus configured to separate the above-mentioned zinc sulfide and the above-mentioned mother liquor for nickel recovery; and a storage tank configured to temporarily store the above-mentioned mother liquor for nickel recovery containing the zinc sulfide while to transfer said mother liquor for nickel recovery containing the zinc sulfide to the above-mentioned filter apparatus by installed flow piping coupled to transfer piping connected to said filter apparatus, wherein the above-mentioned flow piping installed in the above-mentioned storage tank is coupled to circulation piping at a coupling portion to the above-mentioned transfer piping and branched, and a switching valve is installed at said branch point, wherein furthermore, a measurement portion to measure the flow rate and/or the temperature of a solution flowing through said flow piping is installed in the above-mentioned flow piping, and wherein, in the dezincification plant in the above-mentioned dezincification step, when the dezincification plant is started up after the completion of a periodic inspection, at the time of starting the start-up, without applying a sulfurization treatment to the above-mentioned post-neutralization solution, said post-neutralization solution is controlled to be circulated to the above-mentioned dezincification reaction tank via the above-mentioned circulation piping coupled to the flow piping of the above-mentioned storage tank by adjustment of the above-mentioned switching valve, and when the flow rate and/or the temperature of the post-neutralization solution circulated reaches a predetermined value or more, a sulfurization treatment is applied to the post-neutralization solution in the dezincification reaction tank thereby to form a zinc-sulfide-containing mother liquor for nickel recovery, and said zinc-sulfide-containing mother liquor for nickel recovery is transferred to the above-mentioned filter apparatus via the above-mentioned transfer piping by adjustment of the above-mentioned switching valve.

Effects of Invention

According to the present invention, in the start-up of a plant after the completion of a periodic inspection thereof in hydrometallurgy of nickel oxide ore, the flow rate and the temperature of process water in a dezincification treatment step can be properly controlled, whereby the plant start-up can be efficiently performed and the amount of residual zinc in a post-dezincification solution can be effectively reduced. Furthermore, a load on a filter cloth used for separation of zinc sulfide can be reduced.

DETAILED DESCRIPTION OF THE INVENTION

Figure 1:
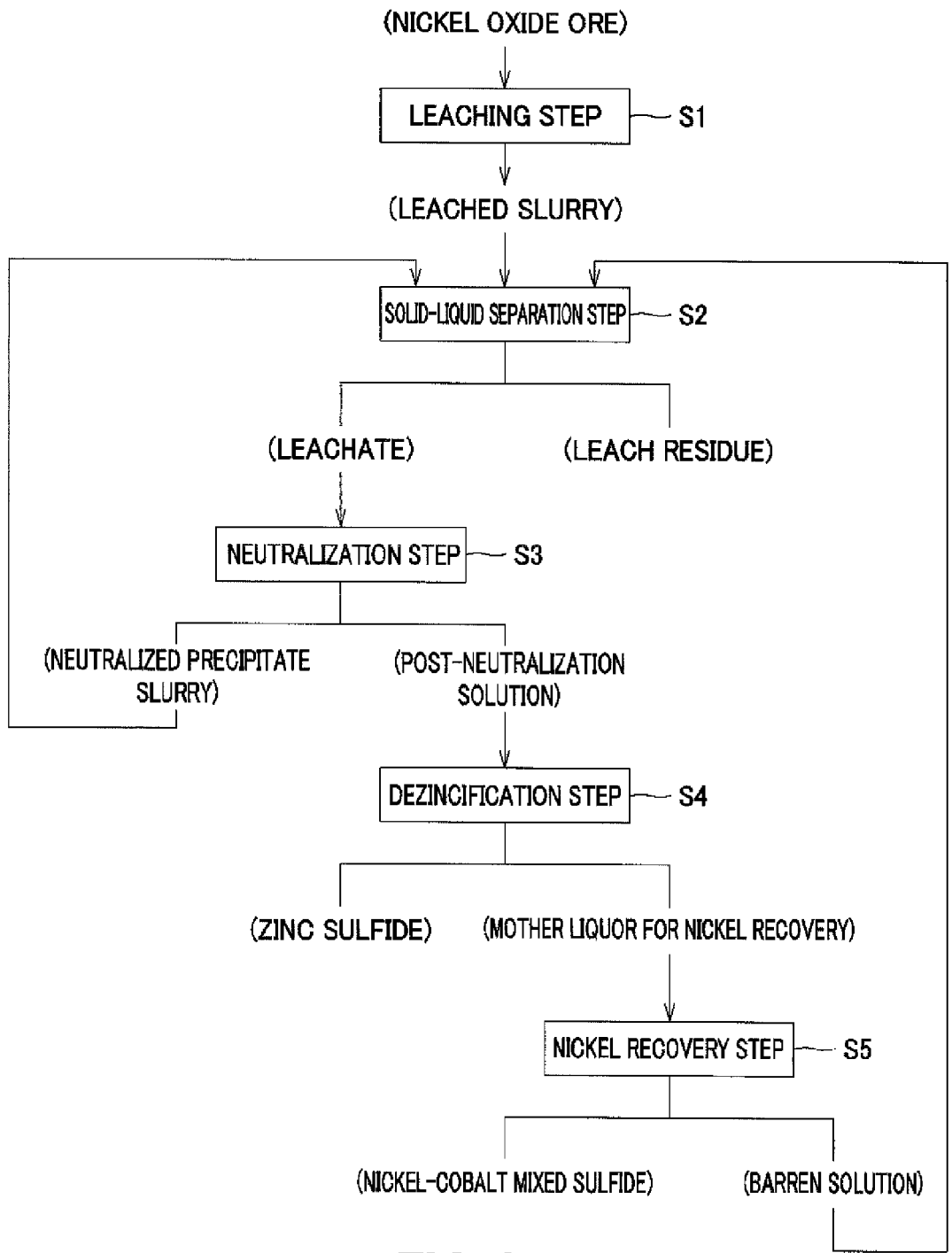
FIG. 1 illustrates a flowchart of a hydrometallurgical method for nickel oxide ore.

Hereinafter, a dezincification plant and a method for operating the same according to the present invention will be explained. It should be noted that the explanation will be given in the following order.
1. Summary of the present invention
2. Hydrometallurgical method for nickel oxide ore
3. Each step of hydrometallurgical method
  3-1. Leaching step
  3-2. Solid-liquid separation step
  3-3. Neutralization step
    3-3-1. Neutralization plant
    3-3-2. Neutralization method
    3-3-3. Flow rate control of post-neutralization solution
  3-4. Dezincification step
    3-4-1. Dezincification plant
    3-4-2. Operating method of dezincification plant
  3-5. Nickel recovery step (nickel-cobalt mixed sulfide formation step)
4. Examples

1. SUMMARY OF THE PRESENT INVENTION

A dezincification plant and a method for operating the same according to the present invention are a dezincification plant used in a hydrometallurgical method for nickel oxide ore, and a method for operating the same, respectively, the dezincification step being such that a sulfurization treatment is applied to a post-neutralization solution obtained through a neutralization step of neutralizing a leachate of nickel oxide ore thereby to form zinc sulfide, and said zinc sulfide is separated to obtain a mother liquor containing nickel and cobalt for nickel recovery.

According to the above-mentioned dezincification plant and the above-mentioned method for operating the same, the start-up of a plant after a periodic inspection thereof can be smoothly performed, the plant can be stabilized at a usual operation level in a short time, and a dezincification treatment in the dezincification step can be effectively performed, whereby the concentration of zinc in a mother liquor for nickel recovery (post-dezincification reaction solution) can be effectively reduced even to a low concentration of not more than 1 mg/L. Furthermore, in the solid-liquid separation of a dezincificated sulfide formed in the dezincification step of the hydrometallurgical method, a load on a filter cloth used for separation can be reduced, whereby the lifespan of the filter cloth can be improved.

Specifically, according to the present invention, at the time of starting the start-up of a dezincification plant used in a dezincification step after the completion of a periodic inspection thereof, without application of a sulfurization treatment (dezincification treatment) to a transferred post-neutralization solution, said post-neutralization solution is returned to a dezincification reaction tank via circulation piping, and circulated. The post-neutralization solution is thus controlled to be circulated, whereby the flow rate and the temperature of the post-neutralization solution, which have been lowered at the time of the start-up, can be appropriately adjusted, and a sulfurization treatment in the dezincification reaction tank is effectively proceeded, whereby the concentration of zinc contained in a mother liquor for nickel recovery (post-dezincification solution) can be reduced to not more than 1 mg/L. Thus, zinc as an impurity is hardly contained in a nickel-cobalt mixed sulfide formed in the nickel recovery step, which follows the dezincification step, and a sulfide with high purity can be produced.

Hereinafter, a specific embodiment according to the present invention will be explained in more detail with reference to the drawings. It should be noted that the present invention is not limited only to the following embodiment, and various changes can be made within the scope not deviating from the gist of the present invention.

2. HYDROMETALLURGICAL METHOD FOR NICKEL OXIDE ORE

In advance of an explanation about a dezincification plant and a method for operating the same according to the present embodiment, an explanation about a hydrometallurgical method for nickel oxide ore including a dezincification step employing said dezincification plant will be given first. This hydrometallurgical method for nickel oxide ore is a hydrometallurgical method of recovering nickel and cobalt from a slurry of nickel oxide ore, using, for example, a high-temperature and high-pressure acid leaching method (HPAL method).

FIG. 1 illustrates an example of a flowchart of the hydrometallurgical method using high-temperature and high-pressure acid leaching of nickel oxide ore. As shown in FIG. 1, the hydrometallurgical method for nickel oxide ore comprises: a leaching step S1 wherein sulfuric acid is added to a slurry of nickel oxide ore and the slurry is leached under high temperature and high pressure; a solid-liquid separation step S2 wherein multistage washing is applied to a leached slurry to separate a residue, whereby a leachate containing an impurity element as well as nickel and cobalt is obtained; a neutralization step S3 wherein the pH of the leachate is adjusted to separate a neutralized precipitate containing an impurity element therefrom, whereby a post-neutralization solution containing zinc as well as nickel and cobalt is obtained; a dezincification step S4 wherein hydrogen sulfide gas is added to the post-neutralization solution thereby to form zinc sulfide, and the zinc sulfide is separated therefrom thereby to obtain a mother liquor for nickel recovery, the mother liquor containing nickel and cobalt; and a nickel recovery step S5 wherein hydrogen sulfide gas is added to the mother liquor for nickel recovery thereby to form a mixed sulfide containing nickel and cobalt. Hereinafter, each of the steps will be specifically explained.

3. EACH STEP OF HYDROMETALLURGICAL METHOD

3-1. Leaching Step

In the leaching step S1, for example, using high-temperature and high-pressure leaching, sulfuric acid is added to an ore slurry obtained by pulverizing a nickel oxide ore serving as a raw material, whereby a leached slurry is obtained. Specifically, using, for example, a high temperature pressurizing vessel (autoclave), the ore slurry is stirred by pressurization under a high temperature of 220 to 280 degrees C., whereby a leached slurry comprising a leachate and a leach residue is formed.

Laterite ore, such as limonite ore or saprolite ore, is mainly used as the nickel oxide ore in the leaching step S1. The nickel content of laterite ore is usually 0.8 to 2.5% by weight, and the nickel is contained as a hydroxide or a magnesium silicate mineral. Furthermore, the iron content of laterite ore is 10 to 50% by weight, and the iron is mainly in the form of trivalent hydroxide (goethite), but, divalent iron is partially contained in the magnesium silicate mineral. Furthermore, besides such laterite ore, oxide ore containing valuable metals, such as nickel, cobalt, manganese, and copper, for example, manganese lump present in the deep seabed is used in the leaching step S1.

Specifically, in the leaching step S1, leaching reactions and high-temperature hydrolysis reactions which are represented by the following formulas (1) to (5) are caused, whereby sulfate containing nickel, cobalt, or the like is leached out and leached-out iron sulfate is fixed as hematite. It should be noted that, since the fixation of iron ions does not completely proceed, divalent and trivalent iron ions as well as nickel, cobalt, and the like are usually contained in a liquid portion of the obtained leached slurry.

Leaching Reaction $$MO + H_2SO_4 \rightarrow MSO_4 + H_2O \tag{1}$$

(wherein M represents Ni, Co, Fe, Zn, Cu, Mg, Cr, Mn, or the like.)

$$2Fe(OH)_3 + 3H_2SO_4 \rightarrow Fe_2(SO_4)_3 + 6H_2O \tag{2}$$

$$FeO + H_2SO_4 \rightarrow FeSO_4 + H_2O \tag{3}$$

High-Temperature Hydrolysis Reaction $$2FeSO_4 + H_2SO_4 + 1/2O_2 \rightarrow Fe_2(SO_4)_3 + H_2O \tag{4}$$

$$Fe_2(SO_4)_3 + 3H_2O \rightarrow Fe_2O_3 + 3H_2SO_4 \tag{5}$$

The amount of sulfuric acid added in the leaching step S1 is not particularly limited, but an excessive amount enough to leach iron contained in the ore is employed. For example, 300 to 400 kg of sulfuric acid is added per ton of ore. If the amount of sulfuric acid added per ton of ore exceeds 400 kg, sulfuric acid cost becomes higher, which is not preferable.

It should be noted that, from a viewpoint of filterability of a leach residue containing hematite formed in the subsequent solid-liquid separation step S2, adjustment is preferably performed in the leaching step S1 so that a leachate obtained has a pH of 0.1 to 1.0.

3-2. Solid-Liquid Separation Step

In the solid-liquid separation step S2, multistage washing is applied to the leached slurry formed in the leaching step S1, whereby a leachate containing zinc as an impurity element as well as nickel and cobalt and a leach residue are obtained.

Specifically, in the solid-liquid separation step S2, the leached slurry is mixed with a washing liquid, and then solid-liquid is separated by using a solid-liquid separation apparatus, such as a thickening apparatus. First, the slurry is diluted by a washing liquid, and then, the leach residue is condensed as a precipitate in a thickening apparatus. Thus, the amount of nickel adhering to the leach residue can be decreased depending on the degree of the dilution. In actual operations, thickening apparatuses having such function are multistage-connected and used, thereby improving a recovery rate.

The multistage washing in the solid-liquid separation step S2 is not particularly limited, but there is preferably used a counter current decantation method (CCD method) to bring a washing liquid containing no nickel into contact with a counter current. Thus, a washing liquid to be newly introduced in a system can be cut down, while the recovery rates of nickel and cobalt of not less than 95% can be achieved.

The washing liquid is not particularly limited, and a washing liquid which does not contain nickel and does not affect the step may be used. Among such kinds of washing liquid, a washing liquid having a pH of 1 to 3 is preferable. This is because, in the case where aluminum is contained in a leachate, a high pH of a washing liquid causes a large amount of aluminum hydroxide to be formed, thereby leading to poor sedimentation of a leach residue inside a thickening apparatus. Thus, as a washing liquid, a barren solution obtained by the nickel recovery step S5 as a following step and having a low pH (pH of approximately 1 to 3) is preferably repeatedly used.

3-3. Neutralization Step

In the neutralization step S3, the pH of the leachate separated in the solid-liquid separation step S2 is adjusted to separate a neutralized precipitate containing an impurity element therefrom, whereby a post-neutralization solution containing zinc as well as nickel and cobalt is obtained.

Specifically, in the neutralization step S3, while oxidation of the separated leachate is controlled, a neutralizer such as calcium carbonate is added to said leachate so that a post-neutralization solution obtained has a pH of not more than 4, whereby the post-neutralization solution to serve as a mother liquor for nickel recover and a neutralized precipitate slurry containing trivalent iron as an impurity element are formed. Such neutralization of the leachate in the neutralization step S3 allows excessive acid used in the leaching step S1 by high temperature and high pressure acid leaching to be neutralized, whereby a post-neutralization solution to serve as a mother liquor for nickel recovery is formed while trivalent iron ions, aluminum ions, and the like, which remain in the solution, are removed as neutralized precipitates.

<3-3-1. Neutralization Plant>

More specifically, a neutralization method performed in the neutralization step S3 and a neutralization plant which is employed to perform said neutralization method will be explained.

Figure 2:
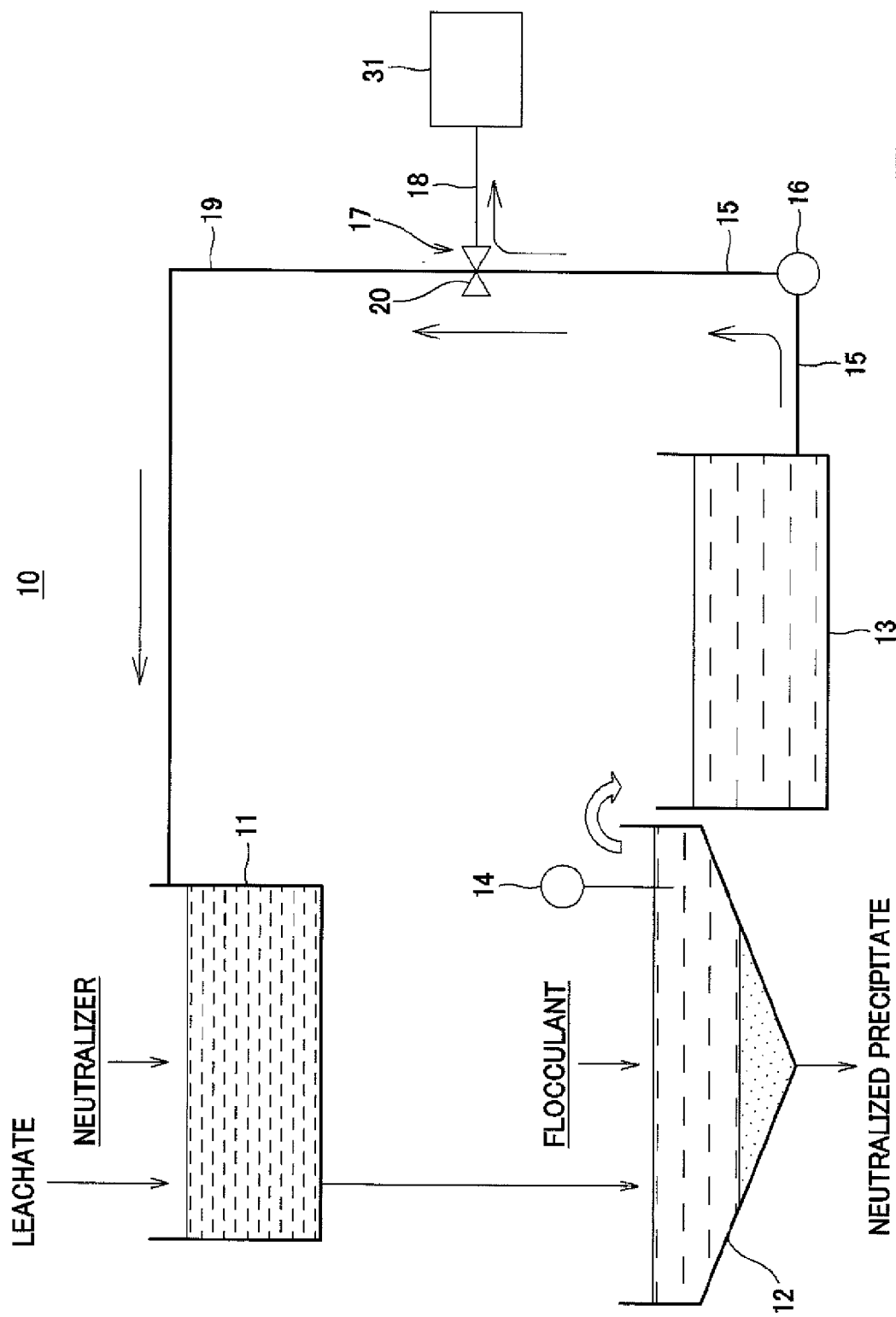
FIG. 2 illustrates a schematic diagram of a neutralization plant.

First, the neutralization plant to be employed in the neutralization step S3 will be explained. FIG. 2 illustrates a schematic diagram showing a configuration of a neutralization plant. As shown in this FIG. 2, a neutralization plant 10 comprises a neutralization reaction tank 11 configured to perform a neutralization reaction, a separation treatment tank 12 configured to separate into a neutralized precipitate and a post-neutralization solution, a storage tank 13 configured to temporarily store the separated post-neutralization solution, and a viscosity measurement portion 14 configured to measure the viscosity of the post-neutralization solution.

The leachate separated in the above-mentioned solid-liquid separation step S2 is fed into the neutralization reaction tank 11, and a neutralizer is added to said leachate thereby to perform a neutralization reaction.

The separation treatment tank 12 is a solid-liquid separation apparatus, such as a thickening apparatus. A post-neutralization-reaction slurry formed by the neutralization reaction of the leachate in the neutralization reaction tank 11 is transferred and fed into said separation treatment tank 12, and said slurry is separated into a post-neutralization solution which is to serve as a mother liquor for nickel recovery and a neutralized precipitate shiny containing trivalent iron as an impurity element. In the separation treatment tank 12, the post-neutralization solution obtained by the solid-liquid separation overflows to be transferred to a storage tank, meanwhile the neutralized precipitate slurry is extracted from the bottom of the separation treatment tank 12. It should be noted that the neutralized precipitate slurry extracted from the bottom of the separation treatment tank 12 can be suitably repeatedly returned to the solid-liquid separation step S2.

The storage tank 13 is configured so that the post-neutralization solution separated in the separation treatment tank 12 and transferred is fed thereinto, and the post-neutralization solution is temporarily stored before being transferred to the dezincification step S4, which follows the neutralization step S3. The storage tank 13, whose details will be described later, acts as a viscosity adjustment buffer capable of reducing the viscosity of the post-neutralization solution obtained by the solid-liquid separation in the separation treatment tank 12.

The storage tank 13 is not particularly limited, but a storage tank having a volume equivalent to not less than 3-hour's reserve volume with respect to the flow rate of the post-neutralization solution is preferable. Such storage tank allows a residence time of the post-neutralization solution in the storage tank 13 to be longer and the post-neutralization solution to effectively stay therein.

Furthermore, in the storage tank 13, there is provided flow piping 15 configured to send the stored post-neutralization solution to the dezincification step S4, which follows the neutralization step S3. The flow piping 15 is to transport the post-neutralization solution stored in the storage tank 13 by a flow pump 16. The flow piping 15 is branched at a predetermined point 17 wherein transfer piping 18 and circulation piping 19 each are coupled thereto, the transfer piping 18 being configured to transfer the post-neutralization solution stored in the storage tank 13 to a dezincification reaction tank 31 for a dezincification treatment of the next step, while the circulation piping 19 being configured to repeatedly return the post-neutralization solution to the neutralization reaction tank 11 thereby to circulate the post-neutralization solution. Furthermore, a switching valve 20 is installed at the branch point 17 wherein the transfer piping 18 and the circulation piping 19 are coupled, whereby the ratio of the post-neutralization solution transferred via the flow piping 15 can be adjusted by switching. A method for transporting the post-neutralization solution from the storage tank 13 via the flow piping 15 will be explained in detail later.

Furthermore, a heat exchanger, not illustrated, is installed in the circulation piping 19 coupled to the flow piping 15, whereby, as will be described in detail later, the post-neutralization solution which is circulated to the neutralization reaction tank 11 at a predetermined quantity ratio can be heated.

The viscosity measurement portion 14 is to measure the viscosity of the post-neutralization solution separated in the separation treatment tank 12 and transferred to the storage tank 13. The viscosity measurement portion 14 is not particularly limited, but, for example, a granulometer or the like may be installed in piping, a flow path, or the like, on the way from the overflow of the post-neutralization solution from the separation treatment tank 12 to the transfer thereof to the storage tank 13. Alternatively, a granulometer, a particle size measuring apparatus, or the like may be integrally installed in the separation treatment tank 12 thereby to measure the viscosity of the post-neutralization solution, which is supernatant liquid after the solid-liquid separation in the separation treatment tank 12. Alternatively, the viscosity measurement portion 14 may be configured to measure the viscosity of the post-neutralization solution temporarily stored in the storage tank 13.

<3-3-2. Neutralization Method>

Next, a neutralization method in the neutralization step S3 performed using the neutralization treatment plant 10 having the above-mentioned configuration will be explained.

Figure 3:
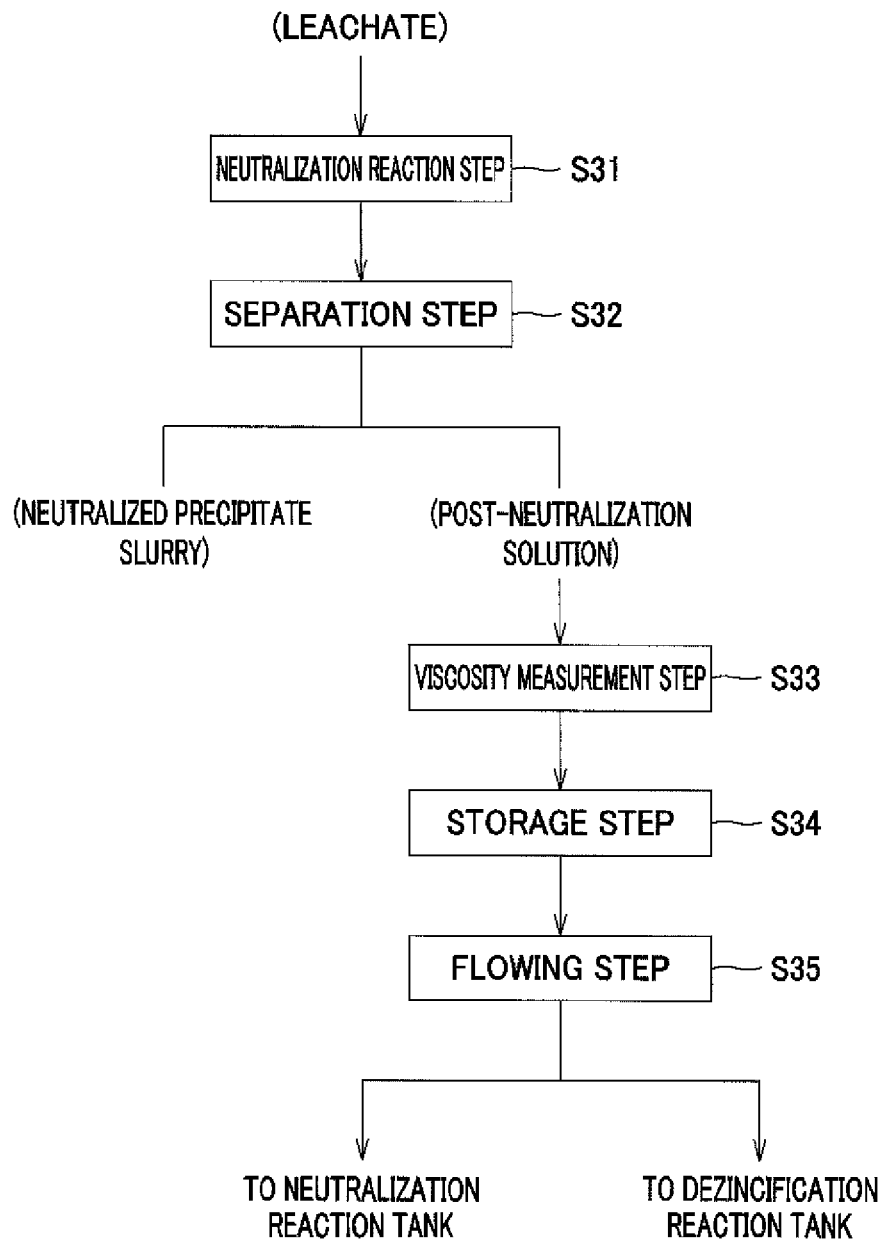
FIG. 3 illustrates a flowchart of a neutralization method.

FIG. 3 illustrates an example of a flowchart of the neutralization method in the neutralization step S3. As shown in FIG. 3, the neutralization method comprises: a neutralization reaction step S31 of performing a neutralization reaction, in the neutralization reaction tank 11, of a leachate obtained through the solid-liquid separation step S2; a separation step S32 of adding a flocculant to a slurry obtained after the neutralization reaction in the separation treatment tank 12, thereby separating into a neutralized precipitate and a post-neutralization solution; a viscosity measurement step S33 of measuring the viscosity of the post-neutralization solution obtained through the separation step S32 in the viscosity measurement portion 14; a storage step S34 of temporarily storing the post-neutralization solution in the storage tank 13; and a flowing step S35 of transporting the stored post-neutralization solution.

(Neutralization Reaction Step)

In the neutralization reaction step S31, a neutralization reaction is performed in the neutralization reaction tank 11 of the above-mentioned neutralization plant 10 by adding a neutralizer to the leachate fed in. Specifically, in the neutralization reaction step S31, while oxidation of the leachate is inhibited, a neutralizer such as calcium carbonate is added to said leachate so that a post-neutralization solution obtained has a pH of not more than 4, whereby the post-neutralization solution to serve as a mother liquor for nickel recover and a neutralized precipitate slurry containing trivalent iron are formed.

In the neutralization reaction step S31, as mentioned above, a neutralizer is added to the leachate so that the pH of the post-neutralization solution is adjusted to not more than 4, preferably 3.0 to 3.5, more preferably 3.1 to 3.2. In the case where the post-neutralization solution has a pH of more than 4, a larger amount of nickel hydroxide is formed.

Furthermore, in the neutralization reaction step S31, a suspended solid comprising a neutralized precipitate and a leach residue obtained in the leaching step S1 is preferably made to remain in the post-neutralization solution so that said post-neutralization solution (sulfurization starting solution), which is to be transferred to a dezincification reaction tank 31 for the dezincification step S4 following the neutralization step S3, has a turbidity of 100 to 400 NTU. Thus, the suspended solid is made to remain, thereby adjusting the turbidity of the post-neutralization solution to the above-mentioned range, whereby the filterability of dezincification sulfide to be formed in the dezincification step S4 as the next step can be further improved.

Furthermore, in the neutralization reaction of the neutralization reaction step S31, when trivalent iron ions remaining in the solution are removed, it is preferable not to oxidize iron ions which are present as divalent ions in the solution. Therefore, oxidation of the solution, for example, by blowing-in of air is preferably prevented as much as possible. Thus, an increase in the amount of calcium carbonate consumed and an increase in the amount of the neutralized precipitate slurry formed, each of which accompanies the removal of divalent iron, can be thus controlled. That is, recovery loss of nickel contained in the precipitate due to an increase in the amount of the neutralized precipitate slurry can be controlled.

The temperature of the neutralization reaction in the neutralization reaction step S31 is preferably 50 to 80 degrees C. When the reaction temperature is less than 50 degrees C., the neutralized precipitate containing trivalent iron ions to be formed becomes minute, whereby an adverse effect is brought in the solid-liquid separation step S2 wherein the neutralized precipitate is circulated as needed. On the other hand, when the reaction temperature is more than 80 degrees C., a decrease in corrosion resistance of apparatus materials constituting the neutralization reaction tank 11 and an increase in energy cost for heating are caused.

(Separation Step)

In the separation step S32, in the separation treatment tank 12 of the above-mentioned neutralization plant 10, the post-neutralization-reaction slurry obtained through the neutralization reaction step S31 is separated into a post-neutralization solution to serve as a mother liquor for nickel recovery and a neutralized precipitate containing an impurity element.

In the separation step S32, a flocculant is added to the post-neutralization-reaction slurry, whereby the slurry it separated into the post-neutralization solution and the neutralized precipitate. Specifically, as the flocculant, for example, an anionic flocculant is used. Thus, addition of a flocculant for the separation allows the sedimentation property of the formed precipitate comprising an impurity element to be promoted, whereby a minute floating precipitate (hereinafter, sometimes referred to as "SS") can be inhibited from being contained in overflow liquid, and the post-neutralization solution and the neutralized precipitate can be effectively separated.

Furthermore, in the separation step S32, the separated neutralized precipitate slurry may be repeatedly transferred to the above-mentioned solid-liquid separation step S2 as needed. Thus, nickel contained in the neutralized precipitate slurry can be effectively recovered. Specifically, the neutralized precipitate slurry is repeatedly transferred to the solid-liquid separation step S2 operated under a low pH condition, whereby the leach residue is washed, and at the same time, the dissolution of nickel hydroxide formed by a local reaction between the neutralized precipitate and water adhering thereto on the surface of the neutralized precipitate is promoted, and thus the amount of nickel to be recovery loss can be reduced.

Moreover, as mentioned later in detail, the operation of repeatedly transferring the separated neutralized precipitate slurry to the solid-liquid separation step S2 can be made to be performed only when the viscosity of the post-neutralization solution is judged to be larger than a predetermined value. Thus, a post-neutralization solution with high viscosity can be prevented from being transferred to a dezincification plant 30 used in the dezincification step S4 as the next step, whereby the filterability in solid-liquid separation in the dezincification step S4 can be improved.

(Viscosity Measurement Step)

In the viscosity measurement step S33, the viscosity of the post-neutralization solution obtained through the separation step S32 is measured in the viscosity measurement portion 14 of the above-mentioned neutralization plant 10. As mentioned above, the viscosity measurement of the post-neutralization solution is performed, for example, by measuring the viscosity of supernatant liquid (overflow liquid) in the separation treatment tank 12. Another aspect of the viscosity measurement may be such that, with this viscosity measurement step being arranged as a following step of the storage step, the viscosity of a post-neutralization solution temporarily stored in the storage tank 13 is measured.

Furthermore, the viscosity measuring method in the viscosity measurement step S33 is not particularly limited as long as the method is capable of measuring the viscosity of a post-neutralization solution in the form of fluid, and a well-known method may be employed, but, from a viewpoint of operation management, a simplified and short-time method is preferable. Furthermore, it may be beneficial that, without calculating a specific viscosity value of a post-neutralization solution, the viscosity thereof is analyzed by calculating an alternative characteristic of the viscosity. Specifically, there may be employed a method wherein, for example, the time required for a post-neutralization solution to pass through a predetermined filter is measured, and this pass-through time is regarded as an alternative characteristic of the viscosity of the post-neutralization solution and controlled.

Among the methods, the present embodiment employs a method for viscosity evaluation wherein the time (sec/$cm^2 \cdot mL$) required for 50 mL of a post-neutralization solution (supernatant liquid) to pass through a membrane filter having an opening of 0.45 μm is used for viscosity measurement.

In the present embodiment, it is judged whether or not the viscosity of the post-neutralization solution measured in this viscosity measurement step S33 is more than 0.10 sec/$cm^2 \cdot mL$. Then, the transfer of the post-neutralization solution is controlled based on the measurement results of the viscosity. The details will be mentioned later.

(Storage Step)

In the storage step S34, the post-neutralization solution obtained by the separation in the separation step S32 and having undergone the viscosity measurement in the viscosity measurement step S33 is temporarily stored in the storage tank 13 of the above-mentioned neutralization plant 10.

(Flowing Step)

In the flowing step S35, the post-neutralization solution stored in the storage tank 13 in the storage step S34 is flowed. In this flowing step S35, mainly, the post-neutralization solution stored in the storage tank 13 is transferred to the dezincification reaction tank 31 in the dezincification step S4 following the neutralization step S3. Specifically, the transfer of the post-neutralization solution to the dezincification reaction tank 31 is performed via the flow piping 15 installed in the storage tank 13 and then by making the post-neutralization solution pass through the transfer piping coupled to the flow piping 15.

Furthermore, in this flowing step S35, depending on the measurement result of the viscosity of the post-neutralization solution in the viscosity measurement step S33, the flow rate of the post-neutralization solution transferred via the flow piping 15 and the transfer piping 18 coupled to said flow piping 15 is controlled and, the post-neutralization solution is returned at a predetermined quantity ratio to the neutralization reaction tank 11 via the circulation piping 19 branched from and coupled to the flow piping 15, and circulated.

<3-3-3. Flow Rate Control of Post-Neutralization Solution>

Here, in the neutralization step S3 of the prior arts, when a slurry obtained by neutralizing a leachate is solid-liquid separated into a post-neutralization solution and a neutralized precipitate, a flocculant is added to the slurry. Thus, the amount of SS can be reduced and also the post-neutralization solution and the neutralized precipitate can be effectively separated.

However, in the case where a flocculant is thus added to perform the separation, the flocculant leads the viscosity of the obtained post-neutralization solution to be very high. In the dezincification step S4 as the next step, a sulfurization treatment is applied to the post-neutralization solution transferred from the neutralization step S3, and, in the case where a post-neutralization solution with high viscosity is used here, at the time of solid-liquid separation of a dezincification sulfide precipitate formed by the sulfurization treatment and a mother liquor for nickel recovery, a filter cloth is clogged up, whereby filtration velocity is remarkably reduced. Furthermore, the filter cloth clogging up causes the number of times of washing or the like to be increased, thereby reducing operation efficiency, and also causing the lifespan of the filter cloth to be shortened.

Therefore, in this neutralization method, the viscosity of the post-neutralization solution obtained through the neutralization treatment in the viscosity measurement step S33 is measured, and then it is judged whether or not the measured viscosity is more than a predetermined value. Specifically, a judgment is made using whether or not the time (sec/$cm^2 \cdot mL$) required for 50 mL of the post-neutralization solution to pass through a membrane filter having an opening of 0.45 μm is more than 0.10 sec/$cm^2 \cdot mL$, as a viscosity criterion of a post-neutralization solution. Then, in the case where the viscosity is judged to be more than 0.10 sec/$cm^2 \cdot mL$, in the flowing step S35, the flow rate of the post-neutralization solution to be transferred to the dezincification reaction tank 31 in the dezincification step S4 is controlled, whereby the post-neutralization solution is made to be returned to the neutralization reaction tank 11 at a predetermined quantity ratio and circulated.

In the case where the viscosity of a post-neutralization solution is judged to be more than 0.10 sec/$cm^2 \cdot mL$ under the above-mentioned viscosity criterion, the flow rate ratio of the post-neutralization solution to be controlled in the flowing step S35 is not particularly limited. A specific flow rate ratio may be determined depending on the level of the viscosity of a post-neutralization solution measured in the viscosity measurement step S33, or the like, but, it is preferable that the flow rate of a post-neutralization solution to pass through the transfer piping 18 via the flow piping 15 and transfer to the dezincification reaction tank 31 is set to 60% to 80% of the full flow, meanwhile the flow rate of a post-neutralization solution to pass through the circulation piping 19 via the flow piping 15 and return to the neutralization reaction tank to circulate is set to 20% to 40% of the full flow. In the case where the flow rate of a post-neutralization solution transferred to the dezincification reaction tank 31 is set to less than 60%, there is a possibility that the operation efficiency of a plant as a whole is decreased, on the other hand, in the case where the flow rate of a post-neutralization solution with high viscosity transferred thereto is more than 80%, there is a possibility that an effect on the life extension of a filter cloth is not sufficiently achieved.

Thus, the flow rate of a post-neutralization solution to be transferred to the dezincification reaction tank 31 in the next step is controlled based on the result of viscosity measurement of the post-neutralization solution, and the post-neutralization solution is repeatedly returned to the neutralization reaction tank 11 at a predetermined quantity ratio and circulated, whereby a post-neutralization solution with high viscosity can be prevented from being transferred to the dezincification reaction tank 31.

Furthermore, in the neutralization method, the post-neutralization solution obtained from the separation treatment tank 12 through the separation step S32 is temporarily stored in the storage tank 13 in the storage step S34. The separated post-neutralization solution is thus temporarily stored in the storage tank 13 without being directly transferred to the dezincification reaction tank 31 of the next step, whereby the post-neutralization solution can stay in the storage tank 13. Then, a post-neutralization solution having a high viscosity and returned to the neutralization reaction tank 11 at a predetermined flow rate ratio and circulated is made to stay in the storage tank 13, and the post-neutralization solution is mixed in proportion to the residence time, and therefore the viscosity thereof is effectively reduced. That is, the storage tank 13 which stores a post-neutralization solution in the storage step S34 acts as a buffer in terms of viscosity.

Particularly, in the case where a post-neutralization solution is returned to the neutralization reaction tank 11 at a predetermined quantity ratio and circulated in the flowing step S35, addition of a flocculant in the separation step S32 is preferably stopped. As mentioned above, in the case where a post-neutralization solution with high viscosity is circulated at a predetermined quantity ratio, if the addition of a flocculant in the separation step S32 is stopped, a post-neutralization solution obtained through the neutralization reaction step S31 and the separation step S32 is made to contain only a flocculant derived from the returned post-neutralization solution. Thus, such post-neutralization solution containing a less amount of flocculant overflows from the separation treatment tank 12 and is transferred to the storage tank 13, and also stays in said storage tank 13, and therefore the post-neutralization solution is effectively mixed in and the viscosity thereof can be more effectively reduced.

On the other hand, in the case where the post-neutralization solution is returned to the neutralization reaction tank 11 at a predetermined quantity ratio and circulated, if the addition of a flocculant in the separation step S32 is stopped, the aggregation effect of a neutralized precipitate is reduced. Thus, a neutralized precipitate not sufficiently aggregating is mixed in overflow liquid to serve as a post-neutralization solution, whereby the overflow liquid becomes cloudy.

Then, the transfer of the post-neutralization solution, the cloudy overflow liquid, to the dezincification step S4 causes a filter cloth to be clogged up at the time of separation of zinc sulfide and a mother liquor for nickel recovery, whereby a fault of shortening the lifespan of a filter cloth might be rather caused. However, in the present embodiment, a post-neutralization solution is temporarily stored using the storage tank 13 in the storage step S34, and the time for a post-neutralization solution to stay in the storage tank 13 is secured, and therefore most of a neutralized precipitate as a cause of the cloudiness precipitates at the bottom of the storage tank 13. Hence, the neutralized precipitate as a cause of the cloudiness can be prevented from being transferred to the dezincification step S4, whereby the above-mentioned fault is not caused.

Furthermore, in the case where the post-neutralization solution is returned to the neutralization reaction tank 11 at a predetermined quantity ratio and circulated, without stopping the addition of a flocculant in the separation step S32, the amount of a flocculant to be added may be adjusted based on the flow rate of the post-neutralization solution to be circulated. In the case where the addition of a flocculant is not stopped, the total amount of a flocculant contained in a post-neutralization solution is "(amount of a flocculant newly added)+(amount of a flocculant in a circulated post-neutralization solution)". For example, in the case where only a small amount of a flocculant is contained in a circulated post-neutralization solution, in consideration of the flow rate of said circulated post-neutralization solution, the amount of a flocculant newly added may be adjusted to be equivalent to ½ or ⅓ of a usual amount. Thus, a reduction in aggregation effect in the separation step S32 can be inhibited, and in addition, the viscosity of a post-neutralization solution can be reduced. Such adjustment of the amount of a flocculant added can be more easily performed by the calculation of the amount of a flocculant contained in a circulated post-neutralization solution.

It should be noted that, in the case where the post-neutralization solution is returned to the neutralization reaction tank 11 at a predetermined quantity ratio and circulated, based on the length of the residence time gained in proportion to the volume of the storage tank 13, it may be selected whether addition of a flocculant in the separation step S32 is stopped or the amount of an flocculant to be added is adjusted. That is, in the case where the volume of the storage tank 13 is large enough to gain a sufficient residence time, it is beneficial to choose the method of adjusting the amount of a flocculant to be added. On the other hand, in the case where the volume of the storage tank 13 is not large enough, also in consideration of operational simplicity (viewpoint of fail-safe), there is preferably established an across-the-board operation rule that the addition of a flocculant is stopped at the point when the viscosity of a post-neutralization solution becomes larger than a predetermined value because the time and effort for calculation of the adjustment amount of an additive can be saved and human errors on operation, such as an error in agent adding operation, can be prevented.

As mentioned above, in the case where it is judged that the viscosity of a post-neutralization solution is more than a predetermined value based on the result of viscosity measurement of the post-neutralization solution, the flow rate of the post-neutralization solution transferred to the dezincification reaction tank 31 in the flowing step S35 is controlled, and the post-neutralization solution is returned to the neutralization reaction tank 11 at a predetermined quantity ratio and circulated. Thus, the viscosity of a post-neutralization solution to overflow the separation treatment tank 12 in the separation step S32 can be gradually reduced.

Furthermore, after that, the viscosity of a post-neutralization solution in the storage tank 13 continues to be similarly adjusted, and, when the viscosity thereof is sufficiently reduced and reaches not more than a predetermined viscosity, the switching valve 20 installed in the flow piping 15 is adjusted in the flowing step S35, whereby the post-neutralization solution stored in the storage tank 13 is transferred to the dezincification reaction tank 31 of the next step, the dezincification step S4. At this time, simultaneously, the amount of a flocculant to be added in the separation step S32 is reset to an usual amount.

Such control of the neutralization treatment in the neutralization step S3 can prevent a post-neutralization solution with high viscosity from being transferred to the dezincification step S4 as the next step, whereby filterability at the time of the separation of zinc sulfide formed in the dezincification step S4 can be improved. Furthermore, clogging of a filter cloth is thus controlled and the lifespan of the filter cloth can be extended. Moreover, the control of clogging of a filter cloth allows the frequency of filter cloth washing operation to be effectively reduced, whereby efficient operation, including in terms of costs, is achieved. Specifically, the frequency of filter cloth washing operation can be reduced to approximately half the frequency thereof in the prior arts, while the lifespan of a filter cloth can be extended approximately 4 times the lifespan thereof in the prior arts.

It should be noted that, in the case where the viscosity of a post-neutralization solution is more than a predetermined value, in addition to the above-mentioned operation of returning the post-neutralization solution to the neutralization reaction tank 11 at a predetermined quantity ratio and circulating it, a neutralized precipitate slurry extracted and discharged from the bottom of the separation treatment tank 12 is made to repeatedly undergo the solid-liquid separation step S2, which is followed by the neutralization step S3. Particularly, in the case where the viscosity of a measured post-neutralization solution is more than 0.5 sec/cm$^2$·mL on the basis of the above-mentioned viscosity criterion, it implies that said post-neutralization solution has a too high viscosity. If such post-neutralization solution is transferred to the dezincification plant 31 and made to undergo the dezincification step S4, the filterability in solid-liquid separation is considerably impaired. Therefore, in the case where the viscosity of a measured post-neutralization solution is more than 0.5 sec/cm$^2$·mL on the basis of the above-mentioned viscosity criterion, in addition to the circulation control of the post-neutralization solution, an operation of making a neutralized precipitate slurry repeatedly undergo the solid-liquid separation step S2 is performed. Thus, the viscosity of the post-neutralization solution can be more effectively reduced.

In actual operations, due to human error (human operational error) or the like, a too large amount of flocculant is sometimes fed in so that, even if a post-neutralization solution stays for a predetermined time in the storage step S34, the viscosity thereof is not sufficiently decreased. For example, before a post-neutralization solution stays enough to sufficiently decrease the viscosity thereof, more amount of a post-neutralization solution is stored in the storage tank 13 with respect to the capacity of the storage tank 13, whereby sometimes a further decrease in viscosity thereof cannot be achieved.

In such case, more amount of a neutralized precipitate separated in the separation step S32 in the neutralization step S3 is made to repeatedly undergo the multistage washing step in the solid-liquid separation step S2. Thus, a liquid phase component with too high viscosity is made to repeatedly undergo the multistage washing step in the solid-liquid separation step S2 together with the neutralized precipitate. The liquid phase component introduced to the solid-liquid separation step S2 together with the neutralized precipitate is diluted by the multistage washing, and therefore the viscosity thereof can be reduced.

3-4. Dezincification Step

In the dezincification step S4, hydrogen sulfide gas is added to a post-neutralization solution obtained through the neutralization step S3 thereby to form zinc sulfide, and said zinc sulfide is separated therefrom to obtain a mother liquor for nickel recovery (post-dezincification solution), the mother liquor containing nickel and cobalt.

Specifically, for example, a post-neutralization solution containing zinc as well as nickel and cobalt is fed into a pressurized container, and hydrogen sulfide gas is blown into a gas phase thereof, whereby zinc is selectively sulfurized with respect to nickel and cobalt, and thus, zinc sulfide and a mother liquor for nickel recovery are formed.

<3-4-1. Dezincification Plant>

Figure 4:
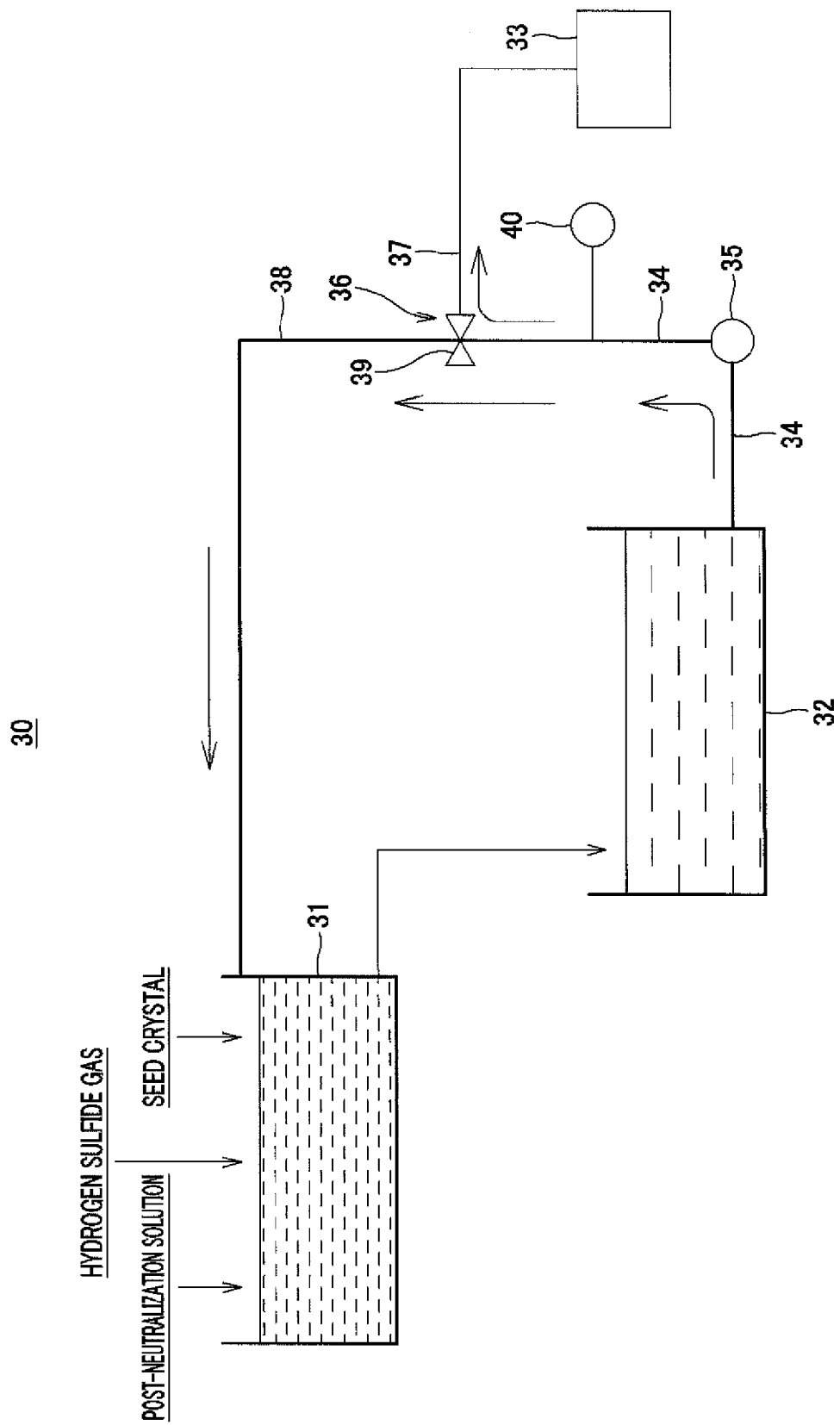
FIG. 4 illustrates a schematic diagram of a dezincification plant.

Here, a dezincification plant to be employed in the dezincification step S4 will be explained. FIG. 4 illustrates a schematic diagram of the dezincification plant. As shown in this FIG. 4, a dezincification plant 30 comprises: a dezincification reaction tank 31 configured to blow hydrogen sulfide gas into a post-neutralization solution to perform a sulfurization reaction; a storage tank 32 configured to temporarily store a formed zinc sulfide and a mother liquor for nickel recovery serving as a post-sulfurization solution; and a filter apparatus 33 configured to separate and remove the zinc sulfide.

A post-neutralization solution obtained through the above-mentioned neutralization step S3 and transferred is fed into the dezincification reaction tank 31, and hydrogen sulfide gas is added to the post-neutralization solution to perform a sulfurization reaction. In this dezincification reaction tank 31, the addition of hydrogen sulfide gas allows the formation of zinc sulfide based on zinc contained in the post-neutralization solution. Furthermore, a solution obtained after the sulfurization treatment in the dezincification reaction tank 31 does not contain zinc and serves as a mother liquor for nickel recovery.

It should be noted that the zinc sulfide and the mother liquor for nickel recovery, which are formed in the dezincification reaction tank 31, are transferred to the following storage tank 32 as they are.

The storage tank 32 is configured that the zinc sulfide obtained in the dezincification reaction tank 31 and the mother liquor for nickel recovery, which is a post-sulfurization solution, are fed thereinto. In the storage tank 32, the zinc sulfide and the mother liquor for nickel recovery are temporarily stored before the zinc sulfide and the mother liquor for nickel recovery are separated and the mother liquor for nickel recovery is transferred to the nickel recovery step S5 following the dezincification step S4. As mentioned later in detail, the post-neutralization solution transported without undergoing a sulfurization treatment in the dezincification reaction tank 31 is stored in the storage tank 32 at the time of the start-up of the dezincification plant 30.

Moreover, in the storage tank 32, flow piping 34 configured to transport zinc sulfide and the mother liquor for nickel recovery, each being stored therein, is installed. The flow piping 34 transports the zinc sulfide and the mother liquor for nickel recovery, each being stored in the storage tank 32, to the filter apparatus 33, using a flow pump 35. The flow piping 34 branches out at a predetermined point 36, and transfer piping 37 configured to transfer the mother liquor for nickel recovery, containing zinc sulfide and being stored in the storage tank 32, to the filter apparatus 33 and circulation piping 38 configured to repeatedly return a post-neutralization solution stored in the storage tank 32 to the dezincification reaction tank 31 and circulate said post-neutralization solution at the time of the start-up of the dezincification plant 30 each are coupled to the flow piping 34. Furthermore, a switching valve 39 is installed at the branch point 36 (coupling portion) in which the transfer piping 37 and the circulation piping 38 each are coupled, whereby the quantity ratio and timing of the transfer to the filter apparatus 33 or the dezincification reaction tank 31 via the flow piping 34 can be switched and adjusted. Furthermore, in the flow piping 34, there is provided a measurement portion 40 capable of measuring the flow rate and/or the temperature of a zinc-sulfide-containing transported mother liquor for nickel recovery or a circulated post-neutralization solution.

The filter apparatus 33 is composed of a filter cloth having a predetermined opening, and the like, and separates zinc sulfide and a mother liquor for nickel recovery from a zinc-sulfide-containing mother liquor for nickel recovery transported through the transfer piping 37 via the flow piping 34.

As mentioned above, in the neutralization plant 10 in the neutralization step S3, depending on the viscosity of a post-neutralization solution obtained, the flow rate of the post-neutralization solution to be transferred to the dezincification reaction tank 31 of the dezincification plant 30 is controlled, and therefore the post-neutralization solution with high viscosity is effectively prevented from being transferred to the dezincification plant 30. Thus, in the filter apparatus 33 in the dezincification plant 30, clogging of a filter cloth is reduced, whereby zinc sulfide can be separated and removed with high filterability. Moreover, since clogging of a filter cloth is thus reduced in this filter apparatus 33, the lifespan of the filter cloth can be extended and operation efficiency of hydrometallurgy can be improved.

<3-4-2. Operation Method of Dezincification Plant>

In plants used for operating hydrometallurgy, including the above-mentioned dezincification plant 30, a periodic inspection for equipment is conducted. In the periodic inspection, sludge staying the bottoms of all of tanks in which process water is stored, such as a reaction tank and a storage tank, piping, filters, and the like is removed and cleaned away, and a broken part is replaced. Therefore, at the time of the periodic inspection, at least, all of process water, such as a post-neutralization solution and a post-dezincification solution, are extracted from equipment to be subject to the inspection, whereby the equipment is made empty. Therefore, at the time of plant start-up after the completion of the periodic inspection, the temperatures of equipment and process water are decreased to approximately the atmospheric temperature (for example, approximately 30 degrees C.). Furthermore, the flow rate of the process water is also greatly decreased.

In prior arts, at the time of plant start-up after the completion of a periodic inspection, it takes approximately one day (approximately 24 hours) to bring the leaching step S1 to 100% operational status, the leaching step S1 being such that sulfuric acid is added to a slurry of nickel oxide ore and leaching is performed under high temperature and high pressure. Therefore, the flow rate and the temperature of process water are greatly unstable until a perfect operational status (usual operation level) is achieved. Such unstable state of the flow rate and the temperature particularly greatly affects the dezincification step S4, and it is very difficult to blow hydrogen sulfide gas into the process water having a temperature and a flow rate in an unstable state, that is, a post-neutralization solution to be subject to a sulfurization treatment, and simultaneously add a suspended solid as a seed crystal thereto. This implies that zinc, an impurity, of high concentration is unwillingly mixed into a solution (a mother liquor for nickel recovery) obtained after a dezincification reaction by sulfurization.

Therefore, in prior arts, there has been taken a measure of adding excessive hydrogen sulfide gas during approximately one day required for the start-up after the periodic inspection in order to avoid zinc from remaining in a mother liquor for nickel recovery formed in the dezincification step S4. However, in the above-mentioned case, there has been a problem that the formed zinc sulfide has a very minute particle size, whereby a heavy load is imposed on the above-mentioned filter apparatus 33, whereby the lifespan of a filter cloth constituting the filter apparatus 33 is made shorter. Furthermore, waste of time due to replacement of the filter cloth and recovery loss of a valuable metal contained in a mother liquor for nickel recovery, the mother liquor being disposed of due to the above-mentioned replacement, have been caused.

Therefore, in the dezincification plant 30 used in the dezincification step S4, when the dezincification plant starts up after the completion of a periodic inspection thereof, at the time of starting the start-up, without applying a sulfurization treatment to a post-neutralization solution in the dezincification reaction tank 31, the switching valve 39 in the flow piping 34 installed in the storage tank 32 is adjusted, whereby the transferred post-neutralization solution is controlled to be returned to the dezincification reaction tank 31 via the circulation piping 38 and circulated.

Then, in the dezincification plant 30, the flow rate and/or the temperature of a post-neutralization solution circulated is measured at the measurement portion 40 installed in the flow piping 34, and, when the flow rate and/or the temperature of said post-neutralization solution reaches a predetermined value or more, a sulfurization treatment is applied to the post-neutralization solution in the dezincification reaction tank 31 thereby to form zinc sulfide, and a mother liquor for nickel recovery containing said zinc sulfide (post-dezincification solution) is transferred to the filter apparatus 33 via the transfer piping 37 by adjusting the switching valve 39.

Here, a predetermined standard value of the flow rate of a circulated post-neutralization solution measured in the measurement portion 40 is not particularly limited, and it is beneficial that whether or not the flow rate thereof allows a sulfurization reaction in the dezincification reaction tank 31 to effectively proceed is set at the standard, and for example, the flow rate value at the time of usual operation can be regarded as the standard. Furthermore, a predetermined standard value of the temperature of a circulated post-neutralization solution measured in the measurement portion 40 is not particularly limited, and it is beneficial that the standard is whether or not the temperature thereof allows a sulfurization reaction in the dezincification reaction tank 31 to effectively proceed is set at the standard, and for example, a temperature of approximately 50 degrees C. can be regarded as the standard.

Thus, in the dezincification plant 30, at the time of plant start-up, a post-neutralization solution is controlled to be circulated and it is judged whether or not the flow rate and the temperature of said post-neutralization solution reach, for example, a flow rate at a usual operation and a temperature of approximately not less than 50 degrees C., respectively. Then, when it is confirmed that the flow rate and the temperature of the post-neutralization solution reach the predetermined value or more, a sulfurization treatment is applied to the post-neutralization solution, and a zinc-sulfide-containing mother liquor for nickel recovery is transferred to the filter apparatus 33.

In the dezincification plant 30 in the dezincification step S4, start-up operation after the completion start-up of a periodic inspection is performed as mentioned above, whereby the flow rate and the temperature of a post-neutralization solution, which serves as process water, can be stabilized, and the stabilized post-neutralization solution can be made to undergo a sulfurization treatment in the dezincification reaction tank 31, and transferred to the filter apparatus 33.

Thus, even without the addition of excessive hydrogen sulfide gas, zinc can be effectively made into zinc sulfide, and the concentration of zinc contained in a mother liquor for nickel recovery (post-dezincification solution) can be effectively reduced to not more than 1 mg/L. Furthermore, without imposing a heavy load on a filter cloth of the filter apparatus 33, the lifespan of the filter cloth can be extended. Furthermore, plant startup, although, in the prior arts, having required approximately one day to reach a state of usual operation, can be more efficiently and promptly conducted, and thus a plant is stabilized at an usual operation level in a short time and operation efficiency can be improved.

Furthermore, it is more preferable that, at the time of the start-up after the completion of a periodic inspection, in addition to the above-mentioned control by circulation of a post-neutralization solution in the dezincification plant 30, the flow rate control of a post-neutralization solution in the neutralization plant 10 used in the neutralization step S3 is also performed.

Specifically, in the neutralization step S3, in the start-up of the dezincification plant 30 after the completion of a periodic inspection thereof, at the time of starting the start-up, the switching valve 20 installed in the flow piping 15 of the neutralization plant 10 is adjusted, whereby a post-neutralization solution is controlled to be returned to the neutralization reaction tank 11 and circulated. In other words, without being transferred to the dezincification plant 30, a post-neutralization solution is made to circulate in the neutralization treatment plant 10. Then, when the flow rate and/or the temperature of a post-neutralization solution measured at the measurement portion 40 arranged in the flow piping 34 of the above-mentioned dezincification plant 30 reaches a predetermined value or more, the switching valve 20 is adjusted so as to transfer the post-neutralization solution to the dezincification reaction tank 31 via the transfer piping 18.

At this time, a post-neutralization solution returned to the neutralization reaction tank 11 in the neutralization plant 10 and circulated is preferably circulated while being warmed. As a heating method, a heat exchanger installed in the circulation piping 19 of the neutralization plant 10 may be used for heating.

As mentioned above, in addition to the above-mentioned control in the dezincification plant 30, the flow rate control of a post-neutralization solution in the neutralization plant 10 is performed, whereby plant operation can be stabilized in a shorter time after the start-up thereof. Thus, a sulfurization treatment in the dezincification plant 30 effectively proceeds, and therefore the concentration of zinc contained in a mother liquor for nickel recovery can be reduced more effectively. Furthermore, as mentioned above, a post-neutralization solution to be circulated in the neutralization plant 10 is circulated while being heated, whereby the temperature of the post-neutralization solution in the neutralization plant 10 is made higher, and the post-neutralization solution transferred to the dezincification reaction tank 31 can be more efficiently heated. Also with this, the operation can be stabilized in a further shorter time, and the concentration of zinc in a mother liquor for nickel recovery can be effectively reduced.

3-5. Nickel Recovery Step

In the nickel recovery step S5, hydrogen sulfide gas is blown into a mother liquor for nickel recovery to induce a sulfurization reaction, the mother liquor being obtained by separating and removing zinc, an impurity element, in the form of zinc sulfide in the dezincification step S4, whereby a sulfide containing nickel and cobalt (a nickel-cobalt mixed sulfide) and a barren solution are formed.

The mother liquor for nickel recovery is a sulfuric acid solution, which is obtained from a leachate of nickel oxide ore by reducing an impurity component in the leachate via the neutralization step S3 and the dezincification step S4, and for example, the mother liquor has a pH of 3.2 to 4.0, a nickel concentration of 2 to 5 g/L, and a cobalt concentration of 0.1 to 1.0 g/L. It should be noted that there is a possibility for approximately a few g/L of iron, magnesium, manganese, and the like to be contained, as impurity components, in this mother liquor for nickel recovery, but, these impurity components have low stability as a sulfide with respect to nickel and cobalt to be recovered, and hence are not contained in a sulfide to be formed.

In the nickel recovery step S5, a nickel-cobalt mixed sulfide containing less impurity component and a barren solution in which the concentration of nickel is stabilized at a low level are formed and recovered. Specifically, a slurry of nickel-cobalt mixed sulfide obtained by a sulfurization reaction undergoes sedimentation using a precipitator, such as a thickening apparatus, whereby a nickel-cobalt mixed sulfide as a precipitate is separated and recovered from the bottom of the thickening apparatus. On the other hand, an aqueous solution component is made to overflow, thereby being recovered as a barren solution. It should be noted that, as mentioned above, this barren solution contains unsulfurized impurity elements of iron, magnesium, manganese, and the like.

4. EXAMPLES

Hereinafter, examples according to the present invention will be described, but, the present invention is not limited to the following examples.

EXAMPLES

Example 1

After a periodic inspection was performed for leaching metallurgical plants for nickel oxide ore over one week, each of the plants was started up, and, in a dezincification plant, the following operation was performed in a dezincification treatment step at the time of the start-up thereof. It should be noted that the temperatures of the plant and process water at the time of the start-up were 30 degrees C.

In the dezincification plant, an operation was performed with the flow rate of a post-neutralization solution transferred thereto of 360 to 450 m³/hr. Furthermore, in the start-up after the completion of the periodic inspection, at the time of starting the start-up, without applying a sulfurization treatment to the transferred post-neutralization solution, a switching valve in flow piping installed in a storage tank is adjusted, whereby the post-neutralization solution is controlled to be circulated to a dezincification reaction tank via circulation piping.

Then, after it was confirmed that the temperature of the circulated post-neutralization solution reached 60 degrees C., a sulfurization treatment (dezincification reaction) of blowing hydrogen sulfide gas in the dezincification reaction tank was performed to form zinc sulfide, and the switching valve was adjusted to transfer a zinc-sulfide-containing mother liquor for nickel recovery to a filter apparatus, whereby the zinc sulfide was separated and removed.

As a result of such operation performed, it was confirmed that the concentration of zinc in a post-dezincification reaction solution (a mother liquor for nickel recovery) was 0.9 mg/L on average, which was less than an upper control limit value of 1 mg/L.

Furthermore, after that, a leaching plant for a leaching step was started up and the flow rate was gradually increased, then the time required for the flow rate of the mother liquor for nickel recovery to reach a designated value of 360 m³/hr was measured, and as a result, the time required was found to be 19 hours.

In the meantime, the concentration of zinc in a mother liquor for nickel recovery (post-dezincification solution) supplied to a sulfurization reaction tank in a nickel recovery step, following the dezincification step, was 0.7 mg/L on average, which satisfied an upper control limit of 1 mg/L. The zinc grade of a nickel-cobalt mixed sulfide formed in the nickel recovery step to which the mother liquor for nickel recovery had been transferred was measured, and as a result, the zinc grade was found to be 0.009% by weight, and satisfied a specification upper limit of 0.020% by weight.

Example 2

After a periodic inspection was performed for metallurgical plants for leaching of nickel oxide ore over one week, the following operations were performed at the time of the start-up of each of the plants. It should be noted that the temperatures of the plant and process water at the time of the start-up were 30 degrees C.

In the dezincification plant, an operation was performed with the flow rate of a post-neutralization solution transferred thereto of 360 to 450 m³/hr. Furthermore, in the start-up after the completion of the periodic inspection, at the time of starting the start-up, without applying a sulfurization treatment to the transferred post-neutralization solution, a switching valve in flow piping installed in a storage tank is adjusted, whereby the post-neutralization solution is controlled to be circulated to a dezincification reaction tank via circulation piping.

Furthermore, meanwhile, at the time of starting the start-up, in a neutralization plant to perform a neutralization step, a switching valve in flow piping installed in a storage tank is adjusted, whereby simultaneously a part of said post-neutralization solution was circulated to a neutralization reaction tank via circulation piping coupled to the flow piping. At this time, the post-neutralization solution circulated was heated using a heat exchanger installed in the circulation piping.

Then, after it was confirmed that the temperature of the post-neutralization solution circulated to the dezincification reaction tank in the dezincification plant reached 60 degrees C., a sulfurization treatment (dezincification reaction) of blowing hydrogen sulfide gas in the dezincification reaction tank was performed to form zinc sulfide, and the switching valve was adjusted to transfer a zinc-sulfide-containing mother liquor for nickel recovery to a filter apparatus, whereby the zinc sulfide was separated and removed.

It should be noted that, when it was confirmed that the temperature of the post-neutralization solution circulated to the dezincification reaction tank in the dezincification plant reached 60 degrees C., also the switching valve was adjusted to stop heat-circulation of the post-neutralization solution to the neutralization reaction tank in the neutralization plant, whereby the whole amount of the post-neutralization solution was transferred to the dezincification reaction tank. At this time, the temperature of the post-neutralization solution transferred to the dezincification reaction tank rose to 40 degrees C. from 30 degrees C., the temperature at the time of starting the start-up.

As a result of such operation, it was confirmed that the concentration of zinc in a post-dezincification reaction solution (mother liquor for nickel recovery) was 0.9 mg/L on average, which was less than an upper control limit value of 1 mg/L.

Furthermore, after that, a leaching plant for a leaching step was started up and the flow rate was gradually increased, then the time required for the flow rate of the mother liquor for nickel recovery to reach a designated value of 360 m³/hr was measured, and as a result, the time required was found to be 12 hours. As mentioned above, the reason why the flow rate of the mother liquor for nickel recovery reached the designated value in a shorter time than in Example 1 may be that, not only the circulation of a post-neutralization solution in the dezincification plant, but also the heat-circulation of a post-neutralization solution in the neutralization plant were performed, thereby allowing the temperature of the post-neutralization solution in the neutralization plant to be higher and the temperature of the post-neutralization solution transferred to the dezincification reaction tank to rise more quickly, whereby the dezincification reaction was more efficiently and promptly stabilized.

In the meantime, the concentration of zinc in a mother liquor for nickel recovery (post-dezincification solution) supplied to a sulfurization reaction tank in a nickel recovery step, following the dezincification step, was 0.5 mg/L on average, which satisfied an upper control limit of 1 mg/L. The zinc grade of a nickel-cobalt mixed sulfide formed in the nickel recovery step to which the mother liquor for nickel recovery had been transferred was measured, and as a result, the zinc grade was found to be 0.007% by weight, which satisfied a specification upper limit of 0.020% by weight.

Example 3

In Example 3, another periodic inspection, which was different from the above-mentioned inspections performed in Examples 1 and 2, was performed for metallurgical plants for leaching of nickel oxide ore over one week, and then the same operation as in Example 2 was performed at the time of the start-up of each of the plants. It should be noted that the temperatures of the plants and process water at the time of the start-up thereof were 25 degrees C.

It should be noted that, in Example 3, when it was confirmed that the temperature of the post-neutralization solution circulated to the dezincification reaction tank in the dezincification plant reached 60 degrees C., also a switching valve was also adjusted to stop heat-circulation of the post-neutralization solution to the neutralization reaction tank in the neutralization plant, whereby the whole amount of the post-neutralization solution was transferred to the dezincification reaction tank. At this time, the temperature of the post-neutralization solution transferred to the dezincification reaction tank rose to 35 degrees C. from 20 degrees C., the temperature at the time of starting the start-up.

As a result of such operation performed, it was confirmed that the concentration of zinc in a post-dezincification reaction solution (mother liquor for nickel recovery) was 0.9 mg/L on average, which was less than an upper control limit value of 1 mg/L.

Furthermore, after that, a leaching plant for a leaching step was started up and the flow rate was gradually increased, then the time required for the flow rate of the mother liquor for nickel recovery to reach 360 m$^3$/hr of a designated value was measured, and as a result, the time required was found to be 15 hours.

In the meantime, the concentration of zinc in a mother liquor for nickel recovery (post-dezincification solution) supplied to a sulfurization reaction tank in a nickel recovery step, following the dezincification step, was 0.7 mg/L on average, which satisfied an upper control limit of 1 mg/L. The zinc grade of a nickel-cobalt mixed sulfide formed in the nickel recovery step to which the mother liquor for nickel recovery had been transferred was measured, and as a result, the zinc grade was found to be 0.010% by weight, which satisfied a specification upper limit of 0.020% by weight.

Comparative Example 1

In Comparative Example 1, a plant not equipped with circulation piping was used. In other words, in Comparative Example 1, the same periodic inspection as in Examples 1 and 2 was performed for metallurgical plants for leaching over one week. Then, in the start-up after the completion of the periodic inspection, without being circulated in a dezincification plant, a post-neutralization solution was made to undergo a sulfurization treatment (dezincification reaction) of blowing hydrogen sulfide gas in a dezincification reaction tank from the time of starting the start-up, whereby a dezincificated sulfide was formed, and an operation wherein a zinc-sulfide-containing mother liquor for nickel recovery was transferred to a filter apparatus thereby to separate and remove the zinc sulfide was performed. It should be noted that the temperature of the post-neutralization solution transferred to the dezincification reaction tank at the time of the start-up was 30 degrees C., which was extremely lower than a lower control limit of 55 degrees C.

After such operation was performed, a leaching plant for a leaching step was started up and the flow rate was gradually increased, then the time required for the flow rate of the mother liquor for nickel recovery to reach a designated value of 360 m$^3$/hr was measured, and as a result, the time required was found to be 24 hours, and thus it took long time to stabilize the plant at an usual operation level.

Furthermore, a filter of the dezincification plant got clogged up before 24 hours elapsed after the plant start-up, and accordingly replacement thereof was required. Therefore, there were caused not only longer working hours, but also a problem that process water containing a valuable metal and having an amount equivalent to the capacity of a filter tank was disposed of.

Furthermore, the concentration of zinc in a mother liquor for nickel recovery (post-dezincification solution) supplied to a sulfurization reaction tank in the nickel recovery step, following the dezincification step, during the 24 hours that elapsed before the flow rate of the mother liquor for nickel recovery reached a designated value was 12.4 mg/L on average, which was considerably higher than an upper control limit of 1 mg/L. The zinc grade of a nickel-cobalt mixed sulfide formed in the nickel recovery step to which the mother liquor for nickel recovery had been transferred was measured, and as a result, the zinc grade was found to be 0.148% by weight on average, which was greatly higher than a specification upper limit of 0.020% by weight. Therefore, all of the lots concerned were regarded as nonconforming items.

Comparative Example 2

In Comparative Example 2, a plant not equipped with circulation piping was used. In other words, in Comparative Example 2, the same periodic inspection as in Example 3 was performed for metallurgical plants for leaching over one week. Then, in the start-up after the completion of the periodic maintenance inspection, without being circulated in a dezincification plant, a post-neutralization solution was made to undergo a sulfurization treatment (dezincification reaction) of blowing hydrogen sulfide gas in a dezincification reaction tank from the time of starting the start-up, whereby a dezincificated sulfide was formed, and an operation wherein a zinc-sulfide-containing mother liquor for nickel recovery was transferred to a filter apparatus thereby to separate and remove the zinc sulfide was performed. It should be noted that the temperature of the post-neutralization solution transferred to the dezincification reaction tank at the time of the start-up was 30 degrees C., which was extremely lower than a lower control limit of 55 degrees C.

After such operation was performed, a leaching plant for a leaching step was started up and the flow rate was gradually increased, then the time required for the flow rate of the mother liquor for nickel recovery to reach a designated value of 360 m$^3$/hr was measured, and as a result, the time required was found to be 39 hours, and thus it took long time to stabilize the plant at an usual operation level. Thus, during this time, it was impossible to supply a leachate to a neutralization reaction tank in a neutralization step, whereby the liquid volume in a leachate storage tank in which the leachate was stored was extremely increased, and therefore the operation of a leaching plant to perform a leaching step was forced to be suspended.

Furthermore, the concentration of zinc in a mother liquor for nickel recovery (post-dezincification solution) supplied to a sulfurization reaction tank in the nickel recovery step, following the dezincification step, during the 39 hours that elapsed before the flow rate of the mother liquor for nickel recovery reached a designated value was 10.2 mg/L on average, which was considerably higher than an upper control limit of 1 mg/L. The zinc grade of a nickel-cobalt mixed sulfide formed in the nickel recovery step to which the mother liquor for nickel recovery had been transferred was measured, and as a result, the zinc grade was found to be 0.135% by weight on average, which was greatly higher than a specification upper limit of 0.020% by weight. Therefore, all of the lots concerned were regarded as nonconforming items.

Comparative Example 3

In Comparative Example 3, a plant not equipped with circulation piping was used. In other words, in Comparative Example 3, the same periodic inspection as in Example 3 was performed over one week. Then, in the start-up after the completion of the periodic maintenance inspection, without being circulated in a dezincification plant, a post-neutralization solution was made to undergo a sulfurization treatment (dezincification reaction) of blowing hydrogen sulfide gas in a dezincification reaction tank from the time of starting the start-up, whereby a dezincificated sulfide was formed, and an operation wherein a zinc-sulfide-containing mother liquor for nickel recovery was transferred to a filter apparatus thereby to separate and remove the zinc sulfide was performed. It should be noted that the temperature of the post-neutralization solution transferred to the dezincification reaction tank at the time of the start-up was 30 degrees C., which was extremely lower than a lower control limit of 55 degrees C.

After such operation was performed, a leaching plant for a leaching step was started up and the flow rate was gradually increased, then the time required for the flow rate of the mother liquor for nickel recovery to reach a designated value of 360 m$^3$/hr was measured, and as a result, the time required was found to be 51 hours, and thus it took long time to stabilize the plant at an usual operation level. Thus, during this time, a reaction in the dezincification step was not stable, whereby it was impossible to supply a post-neutralization solution to the dezincification reaction tank in the dezincification step, and therefore it was also impossible to supply a leachate to a neutralization reaction tank in a neutralization step, whereby the liquid volume in a leachate storage tank in which the leachate was stored was extremely increased, and accordingly the operation of a leaching plant to perform a leaching step was forced to be suspended.

After that, the leachate in the leachate storage tank was transferred to another tank thereby to lower the liquid level of the storage tank, and the leaching treatment plant configured to perform a leaching step was started up, but, the reaction in the dezincification step was not still stabilized yet, and accordingly the dezincification plant configured to perform the dezincification step was forced to be suspended. Therefore, once again, it became impossible to supply the leachate to the neutralization reaction tank in the neutralization step, whereby the liquid volume in the leachate storage tank was increased again, and accordingly a second suspension of the operation of the leaching plant to perform the leaching step was forced.

Furthermore, the concentration of zinc in a mother liquor for nickel recovery (post-dezincification solution) supplied to a sulfurization reaction tank in the nickel recovery step, following the dezincification step, during the 51 hours that elapsed before the flow rate of the mother liquor for nickel recovery reached a designated value was 13.8 mg/L on average, which was considerably higher than an upper control limit of 1 mg/L. The zinc grade of a nickel-cobalt mixed sulfide formed in the nickel recovery step to which the mother liquor for nickel recovery had been transferred was measured, and as a result, the zinc grade was found to be 0.162% by weight on average, which was greatly higher than a specification upper limit of 0.020% by weight. Therefore, all of the lots concerned were regarded as nonconforming items.

Comparative Example 4

In Comparative Example 4, a plant not equipped with circulation piping was used. In other words, in Comparative Example 4, another periodic inspection, which was different from the periodic inspection performed in Examples 1 to 3, was performed over one week. Then, in the start-up after the completion of the periodic inspection, without being circulated in a dezincification plant, a post-neutralization solution was made to undergo a sulfurization treatment (dezincification reaction) of blowing hydrogen sulfide gas in a dezincification reaction tank from the time of starting the start-up, whereby a dezincificated sulfide was formed, and an operation wherein a zinc-sulfide-containing mother liquor for nickel recovery was transferred to a filter apparatus thereby to separate and remove the zinc sulfide was performed. It should be noted that the temperature of the post-neutralization solution transferred to the dezincification reaction tank at the time of the start-up was 30 degrees C., which was extremely lower than a lower control limit of 55 degrees C.

After such operation was performed, a leaching plant for a leaching step was started up and the flow rate was gradually increased, then the time required for the flow rate of the mother liquor for nickel recovery to reach a designated value of 360 m$^3$/hr was measured, and as a result, the time required was found to be 43 hours, and thus it took long time to stabilize the plant at an usual operation level. Thus, during this time, it was impossible to supply a leachate to a neutralization reaction tank in a neutralization step, whereby the liquid volume in a leachate storage tank in which the leachate was stored was extremely increased, and therefore the operation of the leaching plant to perform the leaching step was forced to be suspended.

After that, although a reaction in the dezincification step remained insufficiently stable, the leaching treatment plant was once started up in order to hurry a leaching treatment, and the supply of the leachate to the neutralization reaction tank in the neutralization step and, in addition, the supply of the post-neutralization solution to the dezincification reaction tank in the dezincification step each were started.

As a result, the concentration of zinc in a mother liquor for nickel recovery (post-dezincification solution) supplied to a sulfurization reaction tank in the nickel recovery step, following the dezincification step, was 23.8 mg/L on average, which was considerably higher than an upper control limit of 1 mg/L. The zinc grade of a nickel-cobalt mixed sulfide formed in the nickel recovery step to which the mother liquor for nickel recovery had been transferred was measured, and as a result, the zinc grade was found to be 0.280% by weight on average, which was greatly higher than a specification upper limit of 0.020% by weight. Therefore, all of the lots concerned were regarded as nonconforming items.

The following Table 1 collectively shows the results of each of Examples and Comparative Examples.

TABLE 1

|  | Temperature of solution (post-neutralization solution) supplied to dezincification reaction tank at the time of plant start-up (° C.) | Liquid temperature just before dezincification reaction (° C.) | Time required for the flow rate of post-dezincification solution to reach designated value (Hr) | Number of suspensions of leaching step during plant start-up (number of times) | Zinc concentration of post-dezincification solution supplied to nickel recovery step (mg/L) | Zinc grade in nickel-cobalt mixture (% by weight) |
|---|---|---|---|---|---|---|
| Example 1 | 30 | 60 | 19 | 0 | 0.7 | 0.009 |
| Example 2 | 40 | 60 | 12 | 0 | 0.5 | 0.007 |
| Example 3 | 35 | 60 | 15 | 0 | 0.7 | 0.010 |

TABLE 1-continued

|  | Temperature of solution (post-neutralization solution) supplied to dezincification reaction tank at the time of plant start-up (° C.) | Liquid temperature just before dezincification reaction (° C.) | Time required for the flow rate of post-dezincification solution to reach designated value (Hr) | Number of suspensions of leaching step during plant start-up (number of times) | Zinc concentration of post-dezincification solution supplied to nickel recovery step (mg/L) | Zinc grade in nickel-cobalt mixture (% by weight) |
|---|---|---|---|---|---|---|
| Comparative Example 1 | 30 | 30 | 24 | 0 | 12.4 | 0.148 |
| Comparative Example 2 | 30 | 30 | 39 | 1 | 10.2 | 0.135 |
| Comparative Example 3 | 30 | 30 | 51 | 2 | 13.8 | 0.162 |
| Comparative Example 4 | 30 | 30 | 43 | 1 | 23.8 | 0.280 |

From the results summarized in this Table 1, it was found that: in the dezincification plant, at the time of the start-up of the plant after the completion of a periodic inspection, a post-neutralization solution is controlled to be circulated to a dezincification reaction tank without applying a sulfurization treatment to the post-neutralization solution; and then, when the flow rate and the temperature of the post-neutralization solution reaches a predetermined value or more, a sulfurization treatment is applied thereto in the dezincification reaction tank, thereby forming a zinc-sulfide-containing mother liquor for nickel recovery, and the mother liquor is transferred to a filter apparatus and separated; such operation at the time of starting the start-up makes it possible to achieve smooth start-up with a reduced time required for reaching an usual operation level as well as to effectively reduce the amount of zinc remaining in a mother liquor for nickel recovery (post-dezincification solution) obtained in the dezincification plant.

REFERENCE SIGNS LIST

10 . . . neutralization plant, 11 . . . neutralization reaction tank, 12 . . . separation treatment tank, 13 . . . storage tank, 14 . . . viscosity measurement portion, 15 . . . flow piping, 16 . . . flow pump, 17 . . . branch point, 18 . . . transfer piping, 19 . . . circulation piping, 20 . . . switching valve, 30 . . . dezincification plant, 31 . . . dezincification reaction tank, 32 . . . storage tank, 33 . . . filter apparatus, 34 . . . flow piping, 35 . . . flow pump, 36 . . . branch point, 37 . . . transfer piping, 38 . . . circulation piping, 39 . . . switching valve, 40 . . . measurement portion

The invention claimed is:

1. A dezincification plant, adapted for use in a hydrometallurgical method for nickel oxide ore, in which a dezincification step is carried out in said plant, the method comprising applying a sulfurization treatment to a post-neutralization solution obtained through a neutralization step of neutralizing a leachate of said nickel oxide ore thereby to form zinc sulfide, and said zinc sulfide is separated to obtain a mother liquor containing nickel and cobalt for nickel recovery, the dezincification plant comprising:

a dezincification reaction tank configured to form zinc sulfide by applying a sulfurization treatment to the post-neutralization solution and form a mother liquor containing said zinc sulfide;

a filter apparatus configured to separate the zinc sulfide and the mother liquor; and a holding tank A configured to hold the zinc-sulfide-containing mother liquor, flow piping A connected to the holding tank A for transferring said zinc-sulfide-containing mother liquor to the filter apparatus, the flow piping A being both coupled to transfer piping A connected to said filter apparatus, and coupled to circulation piping A for circulating the zinc-sulfide-containing mother liquor back to the dezincification reaction tank, at a branch point A, and a switching valve A is installed at said branch point A for switching flow through the flow piping A to the transfer piping A or to the circulation piping A, and a measurement portion to measure a flow rate and/or a temperature of a solution flowing through flow piping A provided therein, wherein the dezincification plant is periodically shut down and inspected, and in start-up of the dezincification plant after completion of the periodic inspection, at a time of starting the start-up, before applying a sulfurization treatment to the post-neutralization solution, said post-neutralization solution is controlled by adjustment of the switching valve A so as to be circulated to the dezincification reaction tank via the circulation piping A, and, when a flow rate and/or a temperature of the post-neutralization solution circulated reach a predetermined value or more, a sulfurization treatment is applied to the post-neutralization solution in the dezincification reaction tank thereby to form the zinc-sulfide-containing mother liquor, and said zinc-sulfide-containing mother liquor is transferred to the filter apparatus via the transfer piping A by adjustment of the switching valve A.

2. A method for operating a dezincification plant, the dezincification plant comprising:

a dezincification reaction tank configured to form zinc sulfide by applying a sulfurization treatment to the post-neutralization solution and form a mother liquor containing said zinc sulfide;

a filter apparatus configured to separate the zinc sulfide and the mother liquor; and a holding tank A configured to hold the zinc-sulfide-containing mother liquor, flow piping A connected to the holding tank A for transferring said zinc-sulfide-containing mother liquor to the filter apparatus, the flow piping A being both coupled to transfer piping A connected to said filter apparatus, and coupled to circulation piping A for circulating the zinc-sulfide-containing mother liquor back to the dezincification reaction tank, at a branch point A, and a switching valve A is installed at said branch point A for switching flow through the flow piping A to the transfer piping A or to the circulation piping A, and a measurement portion to measure a flow rate and/or a temperature of a solution flowing through flow piping A provided therein, the dezincification plant being adapted for use in a dezincification step in a hydrometallurgical method for nickel oxide ore, in which a dezincification step is carried out in said plant, the method comprising applying a sulfurization treatment to a post-neutralization solution obtained through a neutralization step of neutralizing a leachate of said nickel oxide ore thereby to form zinc sulfide, and said zinc sulfide is separated thereby to obtain a mother liquor containing nickel and cobalt for nickel recovery, wherein, as part of said method, the dezincification plant is periodically shut down and inspected, and in start-up of the dezincification plant after completion of the periodic inspection, at a time of starting the start-up, before applying a sulfurization treatment to the post-neutralization solution, said post-neutralization solution is controlled by adjustment of the switching valve A so as to be circulated to the dezincification reaction tank via the circulation piping A, and, when a flow rate and/or a temperature of the post-neutralization solution circulated reach a predetermined value or more, a sulfurization treatment is applied to the post-neutralization solution in the dezincification reaction tank thereby to form the zinc-sulfide-containing mother liquor, and said zinc-sulfide-containing mother liquor is transferred to the filter apparatus via the transfer piping A by adjustment of the switching valve A.

3. A hydrometallurgical method for nickel oxide ore, the hydrometallurgical method comprising:

a neutralization step of neutralizing a leachate obtained by leaching nickel oxide ore to obtain a neutralized precipitate containing an impurity and a post-neutralization solution containing zinc as well as nickel and cobalt; and a dezincification step of applying a sulfurization treatment to said post-neutralization solution to form zinc sulfide and separating said zinc sulfide to obtain a mother liquor for nickel recovery, the mother liquor containing nickel and cobalt and carried out by the method for operating a dezincification plant according to claim 2.

4. The hydrometallurgical method for nickel oxide ore according to claim 3, wherein a neutralization plant configured to perform a neutralization treatment in the neutralization step comprises:

a neutralization reaction tank configured to perform a neutralization reaction of the leachate;

a separation treatment tank configured to add a flocculant to a slurry obtained after the neutralization reaction to separate into a neutralized precipitate and a post-neutralization solution; and a holding tank B configured to hold the post-neutralization solution transferred from the separation treatment tank, wherein flow piping B is connected to said holding tank B, the flow piping B being branched at a predetermined point B provided with a switching valve B, and, at said branched point B, the flow piping B being coupled to transfer piping B configured to transfer the post-neutralization solution to the dezincification reaction tank in the dezincification step and circulation piping B configured to return said post-neutralization solution to the neutralization reaction tank to circulate the post-neutralization solution, wherein, in the neutralization plant in the neutralization step, in start-up of the dezincification plant after completion of the periodic inspection thereof, at a time of starting the start-up, the post-neutralization solution is controlled to be returned to the neutralization reaction tank by adjustment of the switching valve B, and, when a flow rate and/or a temperature thereof measured in the measurement portion installed in the dezincification plant reaches a predetermined value or more, the post-neutralization solution is transferred to the dezincification reaction tank via the transfer piping B by adjustment of the switching valve B.

5. The hydrometallurgical method for nickel oxide ore according to claim 3, the hydrometallurgical method comprising:

a leaching step of adding sulfuric acid to a slurry of the nickel oxide ore to perform leaching under high temperature and high pressure;

a solid-liquid separation step of separating a residue by multistage washing of a leached slurry thereby to obtain a leachate containing an impurity element as well as nickel and cobalt;

the neutralization step, in which the leachate is neutralized by adjusting a pH of the leachate to separate a neutralized precipitate containing an impurity element therefrom, thereby obtaining the post-neutralization solution containing zinc as well as nickel and cobalt;

the dezincification step, in which a hydrogen sulfide gas is added as the sulfurization treatment; and a nickel recovery step of adding hydrogen sulfide gas to the mother liquor nickel recovery thereby to form a mixed sulfide containing nickel and cobalt.

* * * * *